United States Patent
Rao

(10) Patent No.: US 10,846,717 B2
(45) Date of Patent: Nov. 24, 2020

(54) SYSTEM FOR CREATING AND DISTRIBUTING INTERACTIVE ADVERTISEMENTS TO MOBILE DEVICES

(71) Applicant: QUALTRICS, LLC, Provo, UT (US)

(72) Inventor: Bindu Rama Rao, Laguna Niguel, CA (US)

(73) Assignee: QUALTRICS, LLC, Provo, UT (US)

( * ) Notice: Subject to any disclaimer, the term of this patent is extended or adjusted under 35 U.S.C. 154(b) by 43 days.

(21) Appl. No.: 14/985,336

(22) Filed: Dec. 30, 2015

(65) Prior Publication Data

US 2016/0110742 A1    Apr. 21, 2016

Related U.S. Application Data

(63) Continuation of application No. 13/869,678, filed on Apr. 24, 2013, which is a continuation of application
(Continued)

(51) Int. Cl.
| | |
|---|---|
| G06Q 30/02 | (2012.01) |
| G06F 16/957 | (2019.01) |
| H04W 4/18 | (2009.01) |
| G06F 16/64 | (2019.01) |
| H04L 29/08 | (2006.01) |

(52) U.S. Cl.
CPC ......... *G06Q 30/0203* (2013.01); *G06F 16/64* (2019.01); *G06F 16/9577* (2019.01); *G06Q 30/02* (2013.01); *G06Q 30/0267* (2013.01); *G06Q 30/0269* (2013.01); *H04L 67/34* (2013.01); *H04W 4/18* (2013.01)

(58) Field of Classification Search
None
See application file for complete search history.

(56) References Cited

U.S. PATENT DOCUMENTS 3,647,926 A    3/1972    Rohloff et al.
5,036,389 A    7/1991    Morales
(Continued)

FOREIGN PATENT DOCUMENTS

EP    2031498 A1 *    3/2009    ........... G06F 3/1247
WO    WO 06/051858    5/2006

OTHER PUBLICATIONS

Fritzsche, David J., "Building Tutorials Using Wink", 2005, Developments in Business Simulations and Experiential Learning, vol. 32 (Year: 2005).*
(Continued)

*Primary Examiner* — Michael Bekerman
*Assistant Examiner* — Scott Snider
(74) *Attorney, Agent, or Firm* — Keller Jolley Preece

(57) ABSTRACT

A system for mobile devices that facilitates the creation and dissemination of interactive advertisements to a plurality of mobile devices. A computer or PC comprising an interactive media creator is used to generate interactive advertisements and communicate it to a distribution server. Mobile devices have an interactive media client component to receive and present interactive media, such as these interactive advertisements, to a user. User response is collected, user interaction is monitored and reported. Charging for distributing advertisements is supported.

20 Claims, 10 Drawing Sheets

Related U.S. Application Data

No. 13/397,136, filed on Feb. 15, 2012, now Pat. No. 8,433,299, which is a continuation of application No. 11/888,100, filed on Jul. 30, 2007, now Pat. No. 8,131,270.

(60) Provisional application No. 60/899,493, filed on Feb. 5, 2007.

(56) References Cited

U.S. PATENT DOCUMENTS

| | | |
|---|---|---|
| 5,680,305 A | 10/1997 | Apgar, IV |
| 5,740,035 A | 4/1998 | Cohen et al. |
| 5,801,754 A | 9/1998 | Ruybal et al. |
| 5,805,821 A | 9/1998 | Saxena |
| 5,838,314 A | 11/1998 | Neel et al. |
| 5,862,223 A | 1/1999 | Walker et al. |
| 5,870,454 A | 2/1999 | Dahlen |
| 5,873,068 A | 2/1999 | Beaumont et al. |
| 5,905,974 A | 5/1999 | Fraser et al. |
| 5,915,243 A | 6/1999 | Smolen |
| 5,970,473 A | 10/1999 | Gerszberg et al. |
| 6,057,872 A | 5/2000 | Candelore |
| 6,098,085 A | 8/2000 | Blonder et al. |
| 6,161,458 A | 12/2000 | Spatafora |
| 6,175,822 B1 | 1/2001 | Jones |
| 6,189,029 B1 | 2/2001 | Fuerst |
| 6,216,112 B1 | 4/2001 | Fuller et al. |
| 6,267,379 B1 | 7/2001 | Forrest et al. |
| 6,282,713 B1 | 8/2001 | Kitsukawa et al. |
| 6,302,698 B1 | 10/2001 | Ziv-El |
| 6,430,624 B1 | 8/2002 | Jamtgaard et al. |
| 6,477,504 B1 | 11/2002 | Hamlin et al. |
| 6,501,779 B1 | 12/2002 | McLaughlin et al. |
| 6,502,242 B1 | 12/2002 | Howe et al. |
| 6,513,014 B1 | 1/2003 | Walker et al. |
| 6,554,618 B1 | 4/2003 | Lockwood |
| 6,587,835 B1 | 7/2003 | Treyz et al. |
| 6,631,377 B2 | 10/2003 | Kuzumaki |
| 6,721,713 B1 | 4/2004 | Guheen et al. |
| 6,735,778 B2 | 5/2004 | Khoo et al. |
| 6,801,931 B1 | 10/2004 | Ramesh et al. |
| 6,807,532 B1 | 10/2004 | Kolls |
| 6,819,669 B2 | 11/2004 | Rooney |
| 6,823,046 B2 | 11/2004 | Yamade et al. |
| 6,873,688 B1 | 3/2005 | Aarnio |
| 6,873,967 B1 | 3/2005 | Kalagnanam et al. |
| 6,898,645 B2 * | 5/2005 | Abujbara ............... G06F 9/451 710/17 |
| 6,907,402 B1 | 6/2005 | Khaitan |
| 6,941,324 B2 | 9/2005 | Plastina et al. |
| 6,973,432 B1 | 12/2005 | Woodard et al. |
| 7,020,685 B1 | 3/2006 | Chen et al. |
| 7,024,381 B1 | 4/2006 | Hastings et al. |
| 7,032,030 B1 | 4/2006 | Codignotto |
| 7,096,464 B1 | 8/2006 | Weinmann |
| 7,107,311 B1 | 9/2006 | Zittrain et al. |
| 7,133,834 B1 | 11/2006 | Abelow |
| 7,137,126 B1 * | 11/2006 | Coffman ............ G06F 17/30899 719/328 |
| 7,194,756 B2 | 3/2007 | Addington et al. |
| 7,197,120 B2 | 3/2007 | Luehrig et al. |
| 7,222,158 B2 | 5/2007 | Wexelblat |
| 7,261,239 B2 | 8/2007 | Rao |
| 7,310,350 B1 | 12/2007 | Shao et al. |
| 7,336,928 B2 | 2/2008 | Paalasmaa et al. |
| 7,337,127 B1 | 2/2008 | Smith et al. |
| 7,346,545 B2 | 3/2008 | Jones |
| 7,373,320 B1 | 5/2008 | McDonough |
| 7,373,323 B1 | 5/2008 | Dalal et al. |
| 7,405,752 B2 | 7/2008 | Kondo et al. |
| 7,418,472 B2 | 8/2008 | Shoemaker et al. |
| 7,434,050 B2 | 10/2008 | Jeffries |
| 7,444,380 B1 | 10/2008 | Diamond |
| 7,487,435 B2 | 2/2009 | Aviv |
| 7,496,943 B1 | 2/2009 | Goldberg et al. |
| 7,542,920 B1 | 6/2009 | Lin-Hendel |
| 7,657,022 B2 | 2/2010 | Anderson |
| 7,660,864 B2 | 2/2010 | Markki et al. |
| 7,664,734 B2 | 2/2010 | Lawrence et al. |
| 7,685,252 B1 | 3/2010 | Maes et al. |
| 7,688,820 B2 | 3/2010 | Forte et al. |
| 7,706,740 B2 | 4/2010 | Collins et al. |
| 7,715,790 B1 | 5/2010 | Kennedy |
| 7,725,424 B1 | 5/2010 | Ponte et al. |
| 7,783,529 B2 | 8/2010 | Sandholm et al. |
| 7,797,186 B2 | 9/2010 | Dybus |
| 7,827,235 B2 | 11/2010 | Iizuka |
| 7,853,272 B2 | 12/2010 | Tipnis et al. |
| 7,865,829 B1 | 1/2011 | Goldfield et al. |
| 7,899,700 B2 | 3/2011 | Floyd et al. |
| 7,930,343 B2 * | 4/2011 | Zhang ................ G06F 9/451 709/203 |
| 7,941,092 B2 | 5/2011 | Rao |
| 7,947,714 B2 | 5/2011 | Hoffberg |
| 7,956,272 B2 | 6/2011 | Wysocki |
| 7,970,818 B2 | 6/2011 | Guedalia et al. |
| 7,983,611 B2 | 7/2011 | Rao |
| 8,037,506 B2 | 10/2011 | Cooper et al. |
| 8,041,365 B1 | 10/2011 | Gentle et al. |
| 8,041,713 B2 | 10/2011 | Lawrence |
| 8,055,546 B1 | 11/2011 | Cassone et al. |
| 8,073,013 B2 | 12/2011 | Coleman et al. |
| 8,078,096 B2 | 12/2011 | Rao |
| 8,103,738 B2 * | 1/2012 | Nguyen ............. G06F 16/9577 709/217 |
| 8,131,270 B2 | 3/2012 | Rao |
| 8,135,331 B2 | 3/2012 | Rao |
| 8,166,507 B2 * | 4/2012 | McDowell ....... H04N 21/43615 725/82 |
| 8,175,511 B1 | 5/2012 | Sordo et al. |
| 8,180,276 B2 | 5/2012 | Rao |
| 8,191,104 B2 | 5/2012 | Gordon et al. |
| 8,195,749 B2 | 6/2012 | Rao |
| 8,249,920 B2 | 8/2012 | Smith |
| 8,270,893 B2 | 9/2012 | Rao |
| 8,285,196 B2 | 10/2012 | Rao |
| 8,290,810 B2 | 10/2012 | Ramer et al. |
| 8,380,175 B2 | 2/2013 | Rao |
| 8,385,813 B2 | 2/2013 | Rao |
| 8,428,645 B2 | 4/2013 | Rao |
| 8,433,299 B2 | 4/2013 | Rao |
| 8,478,250 B2 | 7/2013 | Rao |
| 8,532,636 B2 | 9/2013 | Rao |
| 8,532,713 B2 | 9/2013 | Rao |
| 8,540,514 B2 | 9/2013 | Gosling |
| 8,565,719 B2 | 10/2013 | Rao |
| 8,700,014 B2 | 4/2014 | Rao |
| 8,700,015 B2 | 4/2014 | Rao |
| 8,898,708 B2 | 11/2014 | Rao |
| 9,092,794 B2 | 7/2015 | Rao |
| 9,100,800 B2 | 8/2015 | Rao |
| 9,158,437 B2 | 10/2015 | Rao |
| 2001/0005837 A1 | 6/2001 | Kojo |
| 2001/0023436 A1 | 9/2001 | Srinivasan et al. |
| 2001/0034607 A1 | 10/2001 | Perschbacher et al. |
| 2001/0042041 A1 | 11/2001 | Moshal et al. |
| 2001/0044327 A1 | 11/2001 | Kanefsky |
| 2001/0044751 A1 | 11/2001 | Pugliese et al. |
| 2001/0047264 A1 | 11/2001 | Roundtree |
| 2001/0047373 A1 | 11/2001 | Jones et al. |
| 2001/0049286 A1 | 12/2001 | Hansmann et al. |
| 2001/0056374 A1 | 12/2001 | Joao |
| 2001/0056396 A1 | 12/2001 | Goino |
| 2002/0001395 A1 | 1/2002 | Davis et al. |
| 2002/0006124 A1 | 1/2002 | Jimenez et al. |
| 2002/0007303 A1 | 1/2002 | Brookler et al. |
| 2002/0016818 A1 | 2/2002 | Kirani et al. |
| 2002/0035486 A1 | 3/2002 | Huyn et al. |
| 2002/0035488 A1 | 3/2002 | Aquila et al. |
| 2002/0040346 A1 | 4/2002 | Kwan |
| 2002/0046200 A1 | 4/2002 | Floven et al. |
| 2002/0052774 A1 * | 5/2002 | Parker ............... G06Q 30/02 705/7.32 |

(56) References Cited

U.S. PATENT DOCUMENTS

| | | |
|---|---|---|
| 2002/0054089 A1 | 5/2002 | Nicholas et al. |
| 2002/0059132 A1 | 5/2002 | Quay et al. |
| 2002/0059373 A1 | 5/2002 | Boys |
| 2002/0059621 A1 | 5/2002 | Thomas et al. |
| 2002/0069161 A1 | 6/2002 | Eckert et al. |
| 2002/0070961 A1 | 6/2002 | Xu et al. |
| 2002/0071528 A1 | 6/2002 | Kumamoto |
| 2002/0095333 A1 | 7/2002 | Jokinen et al. |
| 2002/0106617 A1 | 8/2002 | Hersh |
| 2002/0107737 A1 | 8/2002 | Kaneko et al. |
| 2002/0108109 A1 | 8/2002 | Harris et al. |
| 2002/0116258 A1 | 8/2002 | Stamatelatos et al. |
| 2002/0120593 A1 | 8/2002 | Iemoto et al. |
| 2002/0123359 A1 | 9/2002 | Wei et al. |
| 2002/0124247 A1 | 9/2002 | Houghton |
| 2002/0128908 A1 | 9/2002 | Levin et al. |
| 2002/0138334 A1 | 9/2002 | DeCotiis et al. |
| 2002/0138392 A1 | 9/2002 | LeBlanc |
| 2002/0138462 A1 | 9/2002 | Ricketts |
| 2002/0143975 A1 | 10/2002 | Kimura et al. |
| 2002/0152110 A1* | 10/2002 | Stewart .............. G06Q 30/02 705/7.32 |
| 2002/0155419 A1 | 10/2002 | Banerjee et al. |
| 2002/0156673 A1 | 10/2002 | Barker |
| 2002/0161708 A1 | 10/2002 | Offer |
| 2002/0161833 A1 | 10/2002 | Niven et al. |
| 2002/0165666 A1 | 11/2002 | Fuchs et al. |
| 2002/0178223 A1 | 11/2002 | Bushkin |
| 2002/0183059 A1 | 12/2002 | Noreen et al. |
| 2002/0188746 A1 | 12/2002 | Drosset et al. |
| 2002/0198769 A1 | 12/2002 | Ratcliff, III |
| 2003/0003946 A1 | 1/2003 | Bocconi |
| 2003/0009371 A1 | 1/2003 | Gauba et al. |
| 2003/0014400 A1 | 1/2003 | Siegel |
| 2003/0028871 A1 | 2/2003 | Wang et al. |
| 2003/0036935 A1 | 2/2003 | Nel |
| 2003/0037033 A1 | 2/2003 | Nyman et al. |
| 2003/0037068 A1 | 2/2003 | Thomas et al. |
| 2003/0046140 A1 | 3/2003 | Callahan et al. |
| 2003/0050959 A1 | 3/2003 | Faybishenko et al. |
| 2003/0060284 A1 | 3/2003 | Hamalainen et al. |
| 2003/0065784 A1 | 4/2003 | Herrod |
| 2003/0077559 A1 | 4/2003 | Braunberger et al. |
| 2003/0083895 A1 | 5/2003 | Wright et al. |
| 2003/0084051 A1 | 5/2003 | Depura et al. |
| 2003/0088452 A1 | 5/2003 | Kelly |
| 2003/0088609 A1 | 5/2003 | Guedalia et al. |
| 2003/0096625 A1 | 5/2003 | Lee et al. |
| 2003/0097280 A1 | 5/2003 | Fitzpatrick et al. |
| 2003/0110234 A1 | 6/2003 | Egli et al. |
| 2003/0113038 A1* | 6/2003 | Spencer .............. G06F 16/986 382/305 |
| 2003/0115463 A1 | 6/2003 | Wheeler et al. |
| 2003/0115602 A1 | 6/2003 | Knee et al. |
| 2003/0131055 A1 | 7/2003 | Yashchin et al. |
| 2003/0144873 A1 | 7/2003 | Keshel |
| 2003/0144899 A1 | 7/2003 | Kokubo |
| 2003/0154126 A1 | 8/2003 | Gehlot |
| 2003/0154242 A1 | 8/2003 | Hayes et al. |
| 2003/0163527 A1 | 8/2003 | Hsu |
| 2003/0182245 A1 | 9/2003 | Seo |
| 2003/0204406 A1 | 10/2003 | Reardon et al. |
| 2003/0208433 A1 | 11/2003 | Haddad et al. |
| 2003/0208756 A1 | 11/2003 | Macrae et al. |
| 2003/0211856 A1 | 11/2003 | Zilliacus |
| 2003/0212804 A1 | 11/2003 | Hashemi |
| 2003/0216982 A1 | 11/2003 | Close et al. |
| 2003/0218604 A1 | 11/2003 | Wood et al. |
| 2003/0229533 A1 | 12/2003 | Mack et al. |
| 2003/0233422 A1 | 12/2003 | Csaszar et al. |
| 2004/0019497 A1 | 1/2004 | Volk et al. |
| 2004/0023191 A1 | 2/2004 | Brown et al. |
| 2004/0030631 A1 | 2/2004 | Brown et al. |
| 2004/0034561 A1 | 2/2004 | Smith |
| 2004/0034684 A1 | 2/2004 | Payne |
| 2004/0039684 A1 | 2/2004 | Sandor |
| 2004/0043372 A1 | 3/2004 | Jebb et al. |
| 2004/0044559 A1 | 3/2004 | Malik et al. |
| 2004/0054577 A1 | 3/2004 | Inoue et al. |
| 2004/0058694 A1 | 3/2004 | Mendiola et al. |
| 2004/0064351 A1 | 4/2004 | Mikurak |
| 2004/0064833 A1 | 4/2004 | Lee et al. |
| 2004/0072136 A1 | 4/2004 | Roschelle et al. |
| 2004/0073476 A1* | 4/2004 | Donahue .............. G06Q 10/107 705/7.32 |
| 2004/0073621 A1 | 4/2004 | Sampson |
| 2004/0082346 A1 | 4/2004 | Skytt et al. |
| 2004/0122735 A1* | 6/2004 | Meshkin ............ G06Q 30/0226 705/14.27 |
| 2004/0122856 A1 | 6/2004 | Clearwater |
| 2004/0128183 A1 | 7/2004 | Challey et al. |
| 2004/0139232 A1 | 7/2004 | Giannetti et al. |
| 2004/0139472 A1 | 7/2004 | Furet et al. |
| 2004/0142720 A1 | 7/2004 | Smethers |
| 2004/0148219 A1 | 7/2004 | Norris, III |
| 2004/0179039 A1 | 9/2004 | Blattner et al. |
| 2004/0190767 A1 | 9/2004 | Tedesco et al. |
| 2004/0193683 A1 | 9/2004 | Blumofe |
| 2004/0210923 A1 | 10/2004 | Hudgeons et al. |
| 2004/0225606 A1 | 11/2004 | Nguyen |
| 2004/0230656 A1 | 11/2004 | Sugawara |
| 2004/0234936 A1 | 11/2004 | Ullman et al. |
| 2004/0244037 A1 | 12/2004 | Yamaguchi et al. |
| 2004/0250272 A1 | 12/2004 | Durden et al. |
| 2004/0252814 A1 | 12/2004 | Eakin |
| 2004/0260761 A1 | 12/2004 | Leaute et al. |
| 2005/0005174 A1 | 1/2005 | Connors |
| 2005/0009465 A1 | 1/2005 | Ross et al. |
| 2005/0010544 A1* | 1/2005 | Sleat .................... G16H 10/20 706/46 |
| 2005/0010651 A1 | 1/2005 | Xu et al. |
| 2005/0018766 A1 | 1/2005 | Iwamura |
| 2005/0021754 A1 | 1/2005 | Alda et al. |
| 2005/0027616 A1 | 2/2005 | Jones |
| 2005/0027654 A1 | 2/2005 | Adrian |
| 2005/0028005 A1 | 2/2005 | Carson et al. |
| 2005/0044223 A1 | 2/2005 | Meyerson |
| 2005/0048954 A1 | 3/2005 | Gortz et al. |
| 2005/0054286 A1 | 3/2005 | Kanjilal et al. |
| 2005/0055310 A1 | 3/2005 | Drewett et al. |
| 2005/0060759 A1 | 3/2005 | Rowe et al. |
| 2005/0066361 A1 | 3/2005 | Iijima |
| 2005/0080683 A1 | 4/2005 | Jordan |
| 2005/0086355 A1 | 4/2005 | Deshpande |
| 2005/0086605 A1 | 4/2005 | Ferrer et al. |
| 2005/0108750 A1 | 5/2005 | Nishikawa et al. |
| 2005/0114400 A1 | 5/2005 | Rao |
| 2005/0114881 A1 | 5/2005 | Philyaw et al. |
| 2005/0131983 A1 | 6/2005 | Raciborski et al. |
| 2005/0132192 A1 | 6/2005 | Jeffries et al. |
| 2005/0144061 A1 | 6/2005 | Rarity et al. |
| 2005/0144538 A1 | 6/2005 | Lawrence et al. |
| 2005/0149501 A1 | 7/2005 | Barrett |
| 2005/0150943 A1 | 7/2005 | Rao |
| 2005/0159142 A1 | 7/2005 | Giniger et al. |
| 2005/0165663 A1 | 7/2005 | Razumov |
| 2005/0181722 A1 | 8/2005 | Kopra et al. |
| 2005/0193333 A1 | 9/2005 | Ebert |
| 2005/0203940 A1 | 9/2005 | Farrar et al. |
| 2005/0209050 A1 | 9/2005 | Bartels |
| 2005/0223068 A1 | 10/2005 | Shohfi et al. |
| 2005/0235318 A1 | 10/2005 | Grauch et al. |
| 2005/0240472 A1 | 10/2005 | Postrel |
| 2005/0240623 A1 | 10/2005 | Kobza et al. |
| 2005/0242189 A1 | 11/2005 | Rohs |
| 2005/0251749 A1 | 11/2005 | Lamkin et al. |
| 2005/0256866 A1 | 11/2005 | Lu et al. |
| 2005/0262540 A1 | 11/2005 | Swix et al. |
| 2005/0267816 A1 | 12/2005 | Jaramillo |
| 2005/0283405 A1 | 12/2005 | Mallo et al. |
| 2005/0283428 A1 | 12/2005 | Bartels et al. |
| 2005/0283736 A1 | 12/2005 | Elie |
| 2005/0288958 A1 | 12/2005 | Eraker et al. |
| 2005/0288999 A1 | 12/2005 | Lerner et al. |

(56) References Cited

U.S. PATENT DOCUMENTS

| | | |
|---|---|---|
| 2006/0015637 A1 | 1/2006 | Chung |
| 2006/0024031 A1 | 2/2006 | Taira et al. |
| 2006/0029051 A1 | 2/2006 | Harris |
| 2006/0031591 A1 | 2/2006 | Hollstrom et al. |
| 2006/0034266 A1 | 2/2006 | Harris et al. |
| 2006/0036448 A1 | 2/2006 | Haynie et al. |
| 2006/0047729 A1 | 3/2006 | Yuan |
| 2006/0059174 A1 | 3/2006 | Mese et al. |
| 2006/0068818 A1 | 3/2006 | Leitersdorf et al. |
| 2006/0080232 A1 | 4/2006 | Epps |
| 2006/0085816 A1 | 4/2006 | Funk et al. |
| 2006/0085823 A1 | 4/2006 | Bell et al. |
| 2006/0091203 A1 | 5/2006 | Bakker et al. |
| 2006/0123082 A1 | 6/2006 | Digate et al. |
| 2006/0126544 A1 | 6/2006 | Markel et al. |
| 2006/0129455 A1 | 6/2006 | Shah |
| 2006/0148420 A1 | 7/2006 | Wonak et al. |
| 2006/0155513 A1 | 7/2006 | Mizrahi et al. |
| 2006/0170956 A1 | 8/2006 | Jung et al. |
| 2006/0178947 A1 | 8/2006 | Zsigmond et al. |
| 2006/0190403 A1 | 8/2006 | Lin et al. |
| 2006/0194185 A1 | 8/2006 | Goldberg et al. |
| 2006/0195441 A1 | 8/2006 | Julia et al. |
| 2006/0200384 A1 | 9/2006 | Arutunian et al. |
| 2006/0203758 A1 | 9/2006 | Tee et al. |
| 2006/0206493 A1 | 9/2006 | Lipscomb et al. |
| 2006/0227364 A1 | 10/2006 | Frank |
| 2006/0240851 A1 | 10/2006 | Washburn |
| 2006/0242687 A1 | 10/2006 | Thione et al. |
| 2006/0246915 A1 | 11/2006 | Shrivastava |
| 2006/0259866 A1 | 11/2006 | Prasad et al. |
| 2006/0261151 A1 | 11/2006 | Hansen et al. |
| 2006/0262922 A1 | 11/2006 | Margulies et al. |
| 2006/0265280 A1 | 11/2006 | Nakada et al. |
| 2006/0265281 A1 | 11/2006 | Sprovieri et al. |
| 2006/0277129 A1 | 12/2006 | Johnston |
| 2006/0282304 A1 | 12/2006 | Bedard et al. |
| 2006/0288363 A1 | 12/2006 | Kunkel et al. |
| 2006/0290661 A1 | 12/2006 | Innanen et al. |
| 2006/0294186 A1 | 12/2006 | Nguyen et al. |
| 2007/0001806 A1 | 1/2007 | Poll |
| 2007/0016472 A1 | 1/2007 | Reznik |
| 2007/0022214 A1 | 1/2007 | Harcourt |
| 2007/0025538 A1 | 2/2007 | Jarske et al. |
| 2007/0036282 A1 | 2/2007 | Engelke et al. |
| 2007/0038941 A1 | 2/2007 | Wysocki |
| 2007/0050256 A1 | 3/2007 | Walker et al. |
| 2007/0053513 A1 | 3/2007 | Hoffberg |
| 2007/0060225 A1* | 3/2007 | Hosogai .................. A63F 13/10 463/1 |
| 2007/0061260 A1 | 3/2007 | deGroeve |
| 2007/0086773 A1 | 4/2007 | Ramsten |
| 2007/0099636 A1 | 5/2007 | Roth |
| 2007/0101358 A1 | 5/2007 | Ambady |
| 2007/0105496 A1 | 5/2007 | Bonta et al. |
| 2007/0113263 A1 | 5/2007 | Chatani |
| 2007/0115346 A1 | 5/2007 | Kim et al. |
| 2007/0121580 A1 | 5/2007 | Forte et al. |
| 2007/0121846 A1 | 5/2007 | Altberg et al. |
| 2007/0130463 A1 | 6/2007 | Law et al. |
| 2007/0130585 A1 | 6/2007 | Perret et al. |
| 2007/0136374 A1 | 6/2007 | Guedalia |
| 2007/0136773 A1 | 6/2007 | O'Neil et al. |
| 2007/0142060 A1 | 6/2007 | Moton, Jr. et al. |
| 2007/0150452 A1 | 6/2007 | Tsurumaki et al. |
| 2007/0150512 A1 | 6/2007 | Kong et al. |
| 2007/0150608 A1 | 6/2007 | Randall et al. |
| 2007/0154168 A1 | 7/2007 | Cordray et al. |
| 2007/0155411 A1 | 7/2007 | Morrison |
| 2007/0156828 A1 | 7/2007 | Bramoulle |
| 2007/0157223 A1 | 7/2007 | Cordray et al. |
| 2007/0162459 A1 | 7/2007 | Desai et al. |
| 2007/0162502 A1 | 7/2007 | Thomas et al. |
| 2007/0162566 A1 | 7/2007 | Desai et al. |
| 2007/0174861 A1 | 7/2007 | Song et al. |
| 2007/0192168 A1 | 8/2007 | Van Luchene |
| 2007/0201681 A1 | 8/2007 | Chen et al. |
| 2007/0204003 A1 | 8/2007 | Abramson |
| 2007/0220575 A1 | 9/2007 | Cooper et al. |
| 2007/0233729 A1 | 10/2007 | Inoue et al. |
| 2007/0235527 A1 | 10/2007 | Appleyard et al. |
| 2007/0244749 A1 | 10/2007 | Speiser et al. |
| 2007/0244758 A1 | 10/2007 | Xie |
| 2007/0245365 A1 | 10/2007 | Mitsui |
| 2007/0245366 A1 | 10/2007 | Mitsui |
| 2007/0281692 A1 | 12/2007 | Bucher et al. |
| 2007/0288315 A1 | 12/2007 | Skillen et al. |
| 2007/0294254 A1 | 12/2007 | Yao |
| 2007/0294354 A1 | 12/2007 | Sylvain |
| 2007/0299681 A1 | 12/2007 | Plastina et al. |
| 2008/0005341 A1 | 1/2008 | Subbian |
| 2008/0009268 A1* | 1/2008 | Ramer .............. G06F 17/30867 455/412.1 |
| 2008/0010351 A1 | 1/2008 | Wardhaugh et al. |
| 2008/0013700 A1 | 1/2008 | Butina |
| 2008/0021721 A1 | 1/2008 | Jones et al. |
| 2008/0022325 A1 | 1/2008 | Ober et al. |
| 2008/0027874 A1 | 1/2008 | Monseignat et al. |
| 2008/0040303 A1 | 2/2008 | Fogelson |
| 2008/0066080 A1 | 3/2008 | Campbell |
| 2008/0069120 A1 | 3/2008 | Thomas |
| 2008/0072139 A1 | 3/2008 | Salinas et al. |
| 2008/0082394 A1 | 4/2008 | Floyd et al. |
| 2008/0085675 A1 | 4/2008 | Rao |
| 2008/0085682 A1 | 4/2008 | Rao |
| 2008/0092181 A1 | 4/2008 | Britt |
| 2008/0098071 A1 | 4/2008 | Jones et al. |
| 2008/0107244 A1 | 5/2008 | Setzer |
| 2008/0109278 A1 | 5/2008 | Rao |
| 2008/0119133 A1 | 5/2008 | Rao |
| 2008/0119167 A1 | 5/2008 | Rao |
| 2008/0124687 A1 | 5/2008 | Post |
| 2008/0126113 A1 | 5/2008 | Manning et al. |
| 2008/0126193 A1 | 5/2008 | Robinson |
| 2008/0126226 A1 | 5/2008 | Popkiewicz et al. |
| 2008/0132252 A1 | 6/2008 | Altman et al. |
| 2008/0139239 A1 | 6/2008 | O'Connor |
| 2008/0159178 A1 | 7/2008 | Syrjanen et al. |
| 2008/0163075 A1 | 7/2008 | Beck |
| 2008/0167946 A1 | 7/2008 | Bezos |
| 2008/0201731 A1 | 8/2008 | Howcroft |
| 2008/0209491 A1 | 8/2008 | Hasek |
| 2008/0214162 A1 | 9/2008 | Ramer et al. |
| 2008/0221986 A1 | 9/2008 | Soicher et al. |
| 2008/0222046 A1 | 9/2008 | McIsaac |
| 2008/0227076 A1 | 9/2008 | Johnson |
| 2008/0261524 A1 | 10/2008 | Grushkevich |
| 2008/0261625 A1 | 10/2008 | Hughes |
| 2008/0267155 A1 | 10/2008 | Aragones et al. |
| 2008/0269636 A1 | 10/2008 | Burrows et al. |
| 2008/0281687 A1 | 11/2008 | Hurwitz et al. |
| 2008/0281711 A1 | 11/2008 | Bridges et al. |
| 2008/0288276 A1 | 11/2008 | Harris |
| 2008/0294760 A1 | 11/2008 | Sampson et al. |
| 2008/0299953 A1 | 12/2008 | Rao |
| 2008/0301231 A1 | 12/2008 | Mehta et al. |
| 2009/0011748 A1 | 1/2009 | Hotta |
| 2009/0037265 A1 | 2/2009 | Moona |
| 2009/0063379 A1 | 3/2009 | Kelly |
| 2009/0076882 A1 | 3/2009 | Mei et al. |
| 2009/0117845 A1 | 5/2009 | Rao |
| 2009/0119693 A1 | 5/2009 | Higgins et al. |
| 2009/0119700 A1 | 5/2009 | Sansom |
| 2009/0125510 A1 | 5/2009 | Graham et al. |
| 2009/0176522 A1 | 7/2009 | Kowalewski et al. |
| 2009/0187814 A1 | 7/2009 | Raff |
| 2009/0210347 A1 | 8/2009 | Sarcanin |
| 2009/0240569 A1 | 9/2009 | Ramer et al. |
| 2009/0254851 A1 | 10/2009 | Scott et al. |
| 2009/0259552 A1 | 10/2009 | Chenard et al. |
| 2009/0320077 A1 | 12/2009 | Gazdzinski |
| 2010/0036970 A1 | 2/2010 | Sidi et al. |
| 2010/0094878 A1 | 4/2010 | Soroca et al. |
| 2010/0125498 A1 | 5/2010 | Jaramillo |

(56) References Cited

U.S. PATENT DOCUMENTS

| | | | |
|---|---|---|---|
| 2010/0128666 A1 | 5/2010 | Masson et al. | |
| 2010/0262923 A1 | 10/2010 | Citrin et al. | |
| 2010/0324971 A1* | 12/2010 | Morsberger | G06Q 30/0245 |
| | | | 705/7.32 |
| 2011/0041077 A1 | 2/2011 | Reiner | |
| 2011/0113090 A1 | 5/2011 | Peeri | |
| 2011/0125838 A1 | 5/2011 | Rao | |
| 2011/0154397 A1 | 6/2011 | Macrae et al. | |
| 2011/0178877 A1 | 7/2011 | Swix et al. | |
| 2011/0197236 A1 | 8/2011 | Rao | |
| 2011/0265116 A1 | 10/2011 | Stern et al. | |
| 2012/0022905 A1 | 1/2012 | Meyer et al. | |
| 2012/0028230 A1 | 2/2012 | Devereux | |
| 2012/0060184 A1 | 3/2012 | Nguyen et al. | |
| 2012/0079525 A1 | 3/2012 | Ellis et al. | |
| 2012/0164937 A1 | 6/2012 | Rao | |
| 2012/0233644 A1 | 9/2012 | Rao | |
| 2012/0240146 A1 | 9/2012 | Rao | |
| 2012/0265613 A1 | 10/2012 | Ramer et al. | |
| 2012/0278823 A1 | 11/2012 | Rogers et al. | |
| 2012/0284324 A1 | 11/2012 | Jarville et al. | |
| 2012/0297311 A1 | 11/2012 | Duggal | |
| 2013/0096985 A1 | 4/2013 | Robinson et al. | |
| 2013/0238445 A1 | 9/2013 | Rao | |
| 2014/0038159 A1 | 2/2014 | Rao | |
| 2014/0120868 A1 | 5/2014 | Rao | |
| 2015/0381759 A1 | 12/2015 | Rao | |
| 2018/0337973 A1 | 11/2018 | Rao | |
| 2018/0375917 A1 | 12/2018 | Rao | |

OTHER PUBLICATIONS

"Gif_Text: A Graphics Text Generator". archived on Oct. 11, 2006 at: http://web.archive.org/web/20061011024339/www.srehttp.org/apps/gif_text/mkbutton.htm (Year: 2006).*
"Textplot: Display text information in a graphics plot" crawled on Aug. 11, 2003: https://webcache.googleusercontent.com/search?q=cache:hfcfGd1ZfCwJ:https://rdrr.io/cran/gplots/man/textplot.html+&cd=18&hl=en&ct=clnk&gl=us (Year: 2003).*
WebdesignerDepot Staff (The Evolution of Cell Phone Design Between 1983-2009, May 2009).
U.S. Appl. No. 13/412,574, May 5, 2017, Notice of Allowance.
U.S. Appl. No. 13/869,678, May 18, 2017, Office Action.
U.S. Appl. No. 14/985,353, Apr. 14, 2017, Office Action.
U.S. Appl. No. 13/869,678, Oct. 5, 2017, Office Action.
U.S. Appl. No. 14/985,355, Jul. 12, 2017, Office Action.
U.S. Appl. No. 13/412,574, Apr. 21, 2016, Office Action.
U.S. Appl. No. 13/869,678, Apr. 8, 2016, Office Action.
U.S. Appl. No. 14/985,353, Apr. 1, 2016, Office Action.
U.S. Appl. No. 14/985,330, Dec. 30, 2015, Rao.
U.S. Appl. No. 14/985,334, Dec. 30, 2015, Rao.
U.S. Appl. No. 14/985,340, Dec. 30, 2015, Rao.
U.S. Appl. No. 14/985,342, Dec. 30, 2015, Rao.
U.S. Appl. No. 14/985,344, Dec. 30, 2015, Rao.
U.S. Appl. No. 14/985,351, Dec. 30, 2015, Rao.
U.S. Appl. No. 14/985,352, Dec. 30, 2015, Rao.
U.S. Appl. No. 14/985,353, Dec. 30, 2015, Rao.
U.S. Appl. No. 14/985,355, Dec. 30, 2015, Rao.
U.S. Appl. No. 10/985,702, Oct. 4, 2007, Office Action.
U.S. Appl. No. 10/985,702, Apr. 28, 2008, Office Action.
U.S. Appl. No. 10/985,702, Sep. 11, 2008, Office Action.
U.S. Appl. No. 10/985,702, Apr. 28, 2009, Office Action.
U.S. Appl. No. 10/985,702, Dec. 8, 2009, Office Action.
U.S. Appl. No. 10/985,702, Aug. 6, 2010, Office Action.
U.S. Appl. No. 11/010,985, Nov. 22, 2006, Office Action.
U.S. Appl. No. 11/010,985, May 18, 2007, Notice of Allowance.
U.S. Appl. No. 11/807,670, Dec. 22, 2009, Office Action.
U.S. Appl. No. 11/807,670, Sep. 7, 2010, Office Action.
U.S. Appl. No. 11/807,670, May 27, 2011, Office Action.
U.S. Appl. No. 11/807,670, Jan. 11, 2012, Office Action.
U.S. Appl. No. 11/807,670, May 17, 2012, Notice of Allowance.
U.S. Appl. No. 11/807,672, Jul. 9, 2009, Office Action.
U.S. Appl. No. 11/807,672, Jul. 29, 2010, Office Action.
U.S. Appl. No. 11/807,672, Apr. 27, 2011, Office Action.
U.S. Appl. No. 11/807,672, Mar. 20, 2012, Notice of Allowance.
U.S. Appl. No. 11/810,597, Jan. 28, 2010, Office Action.
U.S. Appl. No. 11/810,597, Oct. 13, 2010, Office Action.
U.S. Appl. No. 11/810,597, May 16, 2011, Office Action.
U.S. Appl. No. 11/810,597, Oct. 21, 2011, Office Action.
U.S. Appl. No. 11/810,597, Apr. 5, 2012, Office Action.
U.S. Appl. No. 11/810,597, Sep. 25, 2012, Office Action.
U.S. Appl. No. 11/821,771, Nov. 26, 2010, Office Action.
U.S. Appl. No. 11/821,771, Jun. 29, 2011, Office Action.
U.S. Appl. No. 11/821,771, Dec. 14, 2011, Notice of Allowance.
U.S. Appl. No. 11/823,006, Nov. 28, 2011, Office Action.
U.S. Appl. No. 11/823,006, Apr. 11, 2012, Office Action.
U.S. Appl. No. 11/823,006, Jun. 3, 2013, Office Action.
U.S. Appl. No. 11/823,006, Mar. 10, 2014, Office Action.
U.S. Appl. No. 11/881,195, Sep. 28, 2010, Office Action.
U.S. Appl. No. 11/881,195, Jun. 9, 2011, Office Action.
U.S. Appl. No. 11/881,195, May 21, 2012, Office Action.
U.S. Appl. No. 11/881,195, Oct. 18, 2012, Office Action.
U.S. Appl. No. 11/881,195, Jul. 18, 2013, Office Action.
U.S. Appl. No. 11/881,195, Dec. 11, 2013, Notice of Allowance.
U.S. Appl. No. 11/888,100, Aug. 4, 2010, Office Action.
U.S. Appl. No. 11/888,100, May 27, 2011, Office Action.
U.S. Appl. No. 11/888,100, Dec. 19, 2011, Notice of Allowance.
U.S. Appl. No. 11/891,193, Sep. 2, 2010, Office Action.
U.S. Appl. No. 11/891,193, May 16, 2011, Office Action.
U.S. Appl. No. 11/891,193, Jan. 27, 2012, Office Action.
U.S. Appl. No. 11/891,193, Apr. 13, 2012, Notice of Allowance.
U.S. Appl. No. 11/891,193, Jan. 4, 2013, Notice of Allowance.
U.S. Appl. No. 11/897,183, Oct. 5, 2010, Office Action.
U.S. Appl. No. 11/897,183, Mar. 15, 2011, Office Action.
U.S. Appl. No. 11/897,183, Dec. 16, 2011, Office Action.
U.S. Appl. No. 11/897,183, Jul. 2, 2012, Notice of Allowance.
U.S. Appl. No. 11/897,183, Oct. 16, 2012, Office Action.
U.S. Appl. No. 11/977,763, Aug. 4, 2010, Office Action.
U.S. Appl. No. 11/977,763, Apr. 4, 2011, Notice of Allowance.
U.S. Appl. No. 11/977,764, Sep. 2, 2010, Office Action.
U.S. Appl. No. 11/977,764, Feb. 22, 2011, Notice of Allowance.
U.S. Appl. No. 11/978,851, Feb. 24, 2011, Office Action.
U.S. Appl. No. 11/978,851, Nov. 2, 2011, Office Action.
U.S. Appl. No. 11/978,851, Jun. 18, 2012, Notice of Allowance.
U.S. Appl. No. 12/011,238, Jul. 8, 2010, Office Action.
U.S. Appl. No. 12/011,238, Feb. 9, 2011, Office Action.
U.S. Appl. No. 12/011,238, Sep. 14, 2011, Office Action.
U.S. Appl. No. 12/011,238, Aug. 14, 2012, Office Action.
U.S. Appl. No. 12/011,238, Feb. 27, 2013, Office Action.
U.S. Appl. No. 12/011,238, Sep. 19, 2013, Office Action.
U.S. Appl. No. 13/017,024, Nov. 21, 2012, Office Action.
U.S. Appl. No. 13/075,144, Aug. 25, 2011, Notice of Allowance.
U.S. Appl. No. 13/075,882, Mar. 25, 2013, Office Action.
U.S. Appl. No. 13/075,882, Oct. 8, 2013, Office Action.
U.S. Appl. No. 13/075,882, Oct. 17, 2014, Notice of Allowance.
U.S. Appl. No. 13/093,733, Sep. 14, 2011, Office Action.
U.S. Appl. No. 13/093,733, Jan. 26, 2012, Office Action.
U.S. Appl. No. 13/093,733, Mar. 19, 2012, Notice of Allowance.
U.S. Appl. No. 13/237,625, Oct. 15, 2012, Office Action.
U.S. Appl. No. 13/237,625, Nov. 30, 2012, Notice of Allowance.
U.S. Appl. No. 13/354,811, May 9, 2013, Notice of Allowance.
U.S. Appl. No. 13/397,136, Jun. 4, 2012, Office Action.
U.S. Appl. No. 13/397,136, Jan. 24, 2013, Notice of Allowance.
U.S. Appl. No. 13/402,880, Sep. 10, 2012, Office Action.
U.S. Appl. No. 13/402,880, Apr. 18, 2013, Office Action.
U.S. Appl. No. 13/402,880, Jun. 25, 2013, Notice of Allowance.
U.S. Appl. No. 13/412,574, Dec. 20, 2012, Office Action.
U.S. Appl. No. 13/412,574, Aug. 15, 2013, Office Action.
U.S. Appl. No. 13/412,574, Jan. 5, 2015, Office Action.
U.S. Appl. No. 13/412,574, Jul. 15, 2015, Office Action.
U.S. Appl. No. 13/473,603, Nov. 7, 2013, Office Action.
U.S. Appl. No. 13/473,606, May 30, 2014, Office Action.
U.S. Appl. No. 13/473,606, Aug. 21, 2014, Office Action.

(56) References Cited

OTHER PUBLICATIONS

U.S. Appl. No. 13/484,605, Oct. 11, 2012, Office Action.
U.S. Appl. No. 13/484,605, Jun. 25, 2013, Notice of Allowance.
U.S. Appl. No. 13/554,619, Mar. 12, 2013, Office Action.
U.S. Appl. No. 13/554,619, Jun. 13, 2013, Notice of Allowance.
U.S. Appl. No. 13/554,685, Dec. 29, 2014, Office Action.
U.S. Appl. No. 13/554,685, Feb. 26, 2015, Notice of Allowance.
U.S. Appl. No. 13/869,678, Oct. 20, 2015, Office Action.
U.S. Appl. No. 13/902,839, Oct. 30, 2013, Office Action.
U.S. Appl. No. 13/902,839, Feb. 4, 2014, Notice of Allowance.
U.S. Appl. No. 13/908,447, Jun. 24, 2015, Notice of Allowance.
U.S. Appl. No. 14/047,015, Nov. 30, 2015, Office Action.
U.S. Appl. No. 14/059,878, May 20, 2015, Notice of Allowance.
U.S. Appl. No. 14/059,878, Jun. 24, 2015, Notice of Allowance.
U.S. Appl. No. 14/147,600, Apr. 21, 2015, Office Action.
U.S. Appl. No. 14/147,600, Nov. 4, 2015, Notice of Allowance.
U.S. Appl. No. 11/891,193, Feb. 27, 2012, Office Action.
U.S. Appl. No. 13/017,024, Nov. 11, 2012, Office Action.
U.S. Appl. No. 13/075,882, Oct. 14, 2014, Notice of Allowance.
U.S. Appl. No. 14/047,015, Nov. 11, 2015, Office Action.
U.S. Appl. No. 14/985,353, Aug. 19, 2016, Office Action.
U.S. Appl. No. 14/985,353, Nov. 16, 2016, Office Action.
Internal Revenue Service, Department of the Treasury, 1040 Instruction, 2004, entire document.
U.S. Appl. No. 13/412,574, Dec. 12, 2016, Office Action.
U.S. Appl. No. 14/985,355, Feb. 7, 2017, Office Action.
U.S. Appl. No. 09/806,544, titled: "Conversational browser and conversational systems," dated Jul. 2, 2001.
U.S. Appl. No. 61/471,991, titled "Tangible Anchoring System for Broadcast/Webcast Studios," dated Apr. 5, 2011.
U.S. Appl. No. 13/869,678, Apr. 5, 2018, Office Action.
U.S. Appl. No. 14/985,355, Jun. 20, 2018, Office Action.
U.S. Appl. No. 14/985,330, Apr. 5, 2018, Office Action.
U.S. Appl. No. 14/985,334, May 3, 2018, Office Action.
U.S. Appl. No. 14/985,351, Apr. 16, 2018, Office Action.
U.S. Appl. No. 14/985,352, Aug. 28, 2018, Office Action.
U.S. Appl. No. 14/985,355, Dec. 28, 2017, Office Action.
U.S. Appl. No. 14/985,330, Nov. 17, 2017, Office Action.
U.S. Appl. No. 14/985,334, Nov. 17, 2017, Office Action.
U.S. Appl. No. 14/985,355, Nov. 16, 2018, Office Action.
U.S. Appl. No. 14/985,344, Aug. 3, 2018, Office Action.
U.S. Appl. No. 16/051,295, Oct. 4, 2018, Office Action.
U.S. Appl. No. 16/051,306, Oct. 4, 2018, Office Action.
U.S. Appl. No. 14/985,351, Nov. 29, 2018, Office Action.
U.S. Appl. No. 14/985,352, Feb. 25, 2019, Office Action.
U.S. Appl. No. 14/985,344, Mar. 8, 2019, Office Action.
U.S. Appl. No. 16/051,295, Feb. 21, 2019, Office Action.
U.S. Appl. No. 16/051,306, Feb. 21, 2019, Office Action.
Boudreaux, Toby, 2006, Deconcept.com, "SWFObject: Javascript Flash Player detection and embed script" archived on Jun. 13, 2006 at http://web.archive.org/web/20060613143233/http://blog.deconcept.conn/swfobject/ (Year: 2006).
Developer's Home, 2006, developershome.com, "Using UAProf (User Agent Profile) to Detect User Agent Types and Device Capabilities", archived on Oct. 18, 2006 at http://web.archive.org/web/20061018093124/http://www.developershonne.conn/wap/detection/detection.asp?page=uaprof (Year: 2006).
U.S. Appl. No. 13/869,678, May 28, 2020, Notice of Allowance.
U.S. Appl. No. 14/985,352, Apr. 3, 2020, Notice of Allowance.
U.S. Appl. No. 16/051,306, Mar. 17, 2020, Notice of Allowance.
U.S. Appl. No. 16/455,555, Jun. 24, 2020, Office Action.
U.S. Appl. No. 14/985,342, Apr. 3, 2020, Office Action.
U.S. Appl. No. 15/931,334, Jun. 19, 2020, Office Action.
U.S. Appl. No. 14/985,352, Jun. 19, 2019, Office Action.
U.S. Appl. No. 14/985,352, Sep. 18, 2019, Office Action.
U.S. Appl. No. 14/985,344, Sep. 18, 2019, Office Action.
U.S. Appl. No. 16/051,295, May 30, 2019, Office Action.
U.S. Appl. No. 16/051,295, Nov. 6, 2019, Office Action.
U.S. Appl. No. 16/051,306, Sep. 18, 2019, Office Action.
U.S. Appl. No. 14/985,340, Oct. 4, 2019, Office Action.
U.S. Appl. No. 16/455,555, Oct. 30, 2019, Office Action.
U.S. Appl. No. 14/985,342, Oct. 31, 2019, Office Action.
U.S. Appl. No. 14/985,344, Jan. 9, 2020, Notice of Allowance.
U.S. Appl. No. 16/051,295, Feb. 20, 2020, Notice of Allowance.
U.S. Appl. No. 16/051,306, Dec. 11, 2019, Office Action.
U.S. Appl. No. 16/051,306, Feb. 19, 2020, Notice of Allowance.
U.S. Appl. No. 14/985,340, dated Sep. 21, 2020, Office Action.
U.S. Appl. No. 14/985,342, dated Aug. 26, 2020, Notice of Allowance.

* cited by examiner

SYSTEM FOR CREATING AND DISTRIBUTING INTERACTIVE ADVERTISEMENTS TO MOBILE DEVICES

CROSS REFERENCES TO RELATED APPLICATIONS

This application is a continuation of U.S. application Ser. No. 13/869,678, filed Apr. 24, 2013, which is a continuation of U.S. application Ser. No. 13/397,136, filed Feb. 15, 2012, now issued as U.S. Pat. No. 8,433,299, which is a continuation of U.S. application Ser. No. 11/888,100, filed Jul. 30, 2007, now issued as U.S. Pat. No. 8,131,270, which claims the benefit of and priority to U.S. Provisional Application No. 60/899,493, filed Feb. 5, 2007. Each of the aforementioned applications and patents are hereby incorporated by reference herein in their entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States Patent Application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional Patent Application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States Patent Application is hereby incorporated herein by reference, in its entirety.

This patent application makes reference to U.S. provisional patent 60/849,715 entitled "QUESTIONNAIRE CLIENT FOR MOBILE DEVICE", filed on Oct. 4, 2006. The complete subject matter of the above-referenced United States Patent Application is hereby incorporated herein by reference, in its entirety.

This patent application makes reference to U.S. provisional patent 60/850,084 entitled "MOBILE DEVICE FOR CREATING ADHOC QUESTIONNAIRE", filed on Oct. 7, 2006. The complete subject matter of the above-referenced United States Patent Application is hereby incorporated herein by reference, in its entirety.

This patent application makes reference to U.S. provisional patent 60/858,546 entitled "QUESTIONNAIRE SERVER CAPABLE OF PROVIDING QUESTIONNAIRES BASED ON DEVICE CAPABILITIES", filed on Nov. 13, 2006. The complete subject matter of the above-referenced United States Patent Application is hereby incorporated herein by reference, in its entirety.

BACKGROUND

1. Technical Field

The present invention relates generally to the interactions between mobile device and a server within a network, and more specifically to the ability to provide interactive advertisements to a user of a mobile device.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

Often a user would want to seek online help using a mobile phone for conducting an activity such as fixing a problem with a car (changing tires for example) or baking a cake, without having to use a bulky notebook computer that might get damaged due to various constraints and problems of a work area. The use of a computer/notebook is not always possible to retrieve help information when they are needed, such as during an accident on the highway or while cooking in a kitchen that has limited space. The use of a mobile phone is preferable in such circumstances but mobile phone in general are not endowed with the features or applications necessary to facilitate easy access to such information in a format that is useable and convenient. The whole process of retrieving necessary information using a mobile phone is inconvenient due to the inability of the Internet websites to provide information that a typical user can easily read, browse through or view on his mobile phone.

Information access from typical Internet based websites from mobile devices are quite often unsatisfactory and not useful due to several factors, not least of which is the multi-media and graphics rich format in which most Internet websites are designed and made available and the verbosity of text. A mobile phone with a small screen is not a good candidate for viewing such complicated and graphics rich (with graphics, flash screens, video components, etc.) content—imagine a webpage being presented to a user that a music component, a whole a page of text (over 3 KB of text) and three large diagrams, and a table of information, all on the same webpage. Such a multi-media webpage is very typical, and is obviously unsuitable for a mobile device.

User interaction in real time, such as those provided for a user using a PC on the Internet, are often not possible for a user using a cell phone. For example, the amount of textual information cannot be a full page of textual information that is typically made available o a PC. Graphical information also cannot be large and too many graphical images should not be on the same webpage. A typical website provides a rich multi-media experience that has several graphical images, large amounts of text, tables, etc. The same website, when accessed from a cell phone, would not only be unreadable, due to its large amount of text, graphics and even video, but also frustrating due to the nature of web sites—the design of websites often being multi-media based (predominantly providing large multi-media web pages full of text, graphics, flash-based and even containing videos). Often webpages on the Internet provide detailed information to a user while soliciting inputs from a user. Thus, there is a problem in presenting a mobile user with information in order to solicit user input when the user is using a cell phone. Soliciting user input from a user when the user is using a cell phone, rather than a PC, is a big problem.

Mobile devices such as a cell phone are therefore devices for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unmanageable and difficult to browse and navigate on a cell phone with a small LCD screen and small keyboard for user input.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The numerous objects and advantages of the present invention may be better understood by those skilled in the art by reference to the accompanying figures in which:

FIG. 1 is a perspective block diagram of an system for mobile devices that facilitates the creation and dissemination of interactive media to a plurality of other recipient mobile devices, wherein the interactive media is disseminated to the recipient mobile devices in a form that is compatible with the capabilities of the respective recipient mobile devices, and wherein the preferences of the user are also factored in.

DETAILED DESCRIPTION OF THE DRAWINGS

Figure 1:
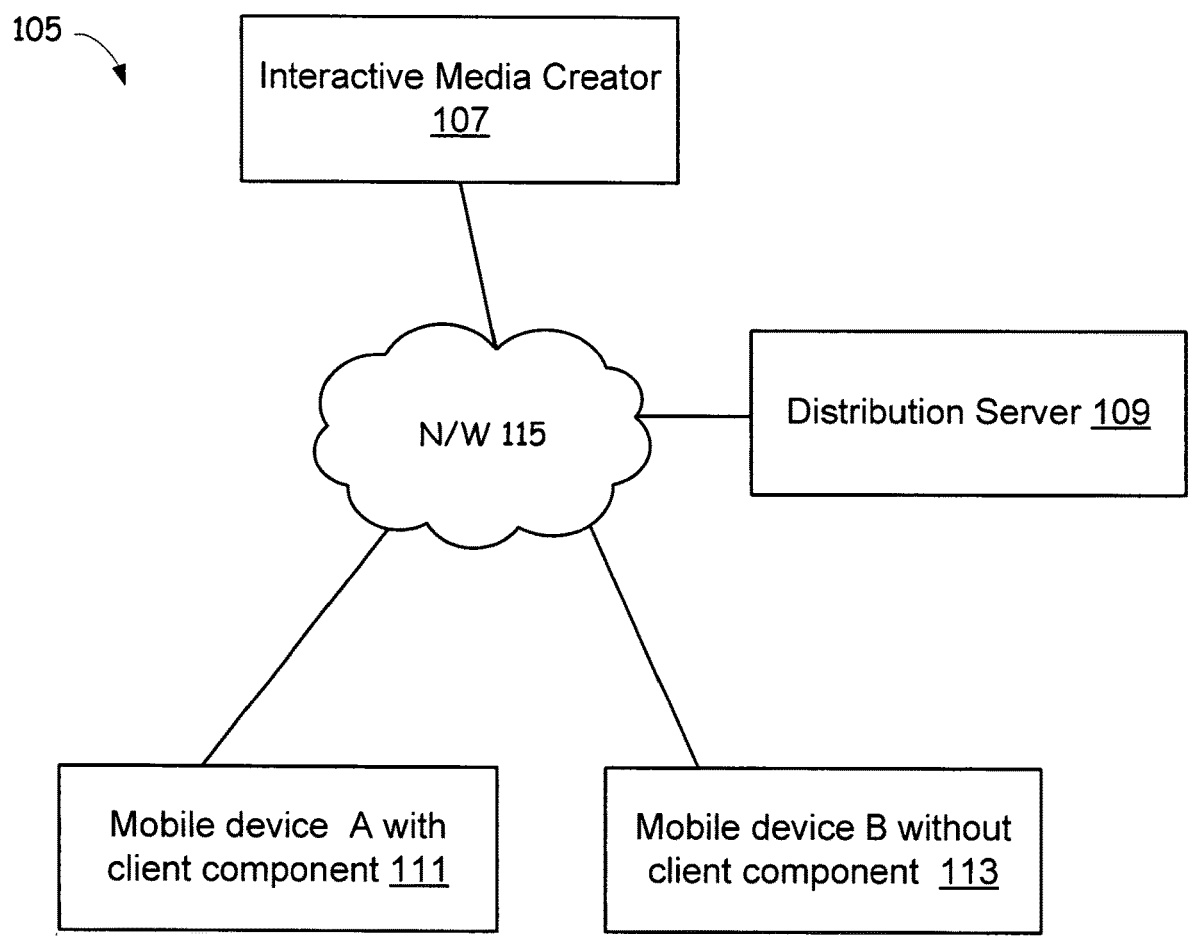

FIG. 1 is a perspective block diagram of an system 105 for mobile devices that facilitates the creation and dissemination of interactive media to a plurality of other recipient mobile devices 111, 113, wherein the interactive media is disseminated to the recipient mobile devices 111, 113 in a form that is compatible with the capabilities of the respective recipient mobile devices 111, 113, and wherein the preferences of the user are also factored in. The system 105 comprises the interactive media creator 107, the plurality of other recipient mobile devices 111, 113 and a distribution server 109. The display of interactive media in a recipient mobile device, such as the recipient mobile device A 111, requires the use of a corresponding client component, such as a QClient, that can display/render interactive media, one at a time.

Each interactive media can comprise several components, some of which are graphics, video content, textual content, and/or audio content. These components may be adapted to the device to make them more appropriate for the recipient devices. For example, graphics may be made more compatible (smaller or compact) to a device if it is not capable of displaying a default size (albeit small) presented by a interactive media creator 107.

The interactive media creator 107 that is communicatively coupled to the distribution server 109 via network 115 makes it possible for a user, such as an advertisement designer, to incorporate text, audio, voice, music, video, graphics etc. into the interactive media. For example, each interactive media that is an audio guided activity (AGA) comprises textual descriptions, audio preambles, optional audio supplementary information, an optional textual supplementary information, for each step of a multi-step audio guided activity. An AGA is used to describe the method to cook a dish using an associated recipe, the process of executing an operation, such as changing the tire on a car, using an associated multi-step operation, etc. The display of each step in a mobile device 111 involves the display of textual descriptions, the playing of audio information such as a preamble, the optional display of supplementary information and the playing of audio supplementary information, if available. A user can view (often using text, and even graphics if available) and optionally listen to the detailed descriptions of each step of an AGA, one step at a time, and browse through each step.

An interactive media that is an advertisement may comprise at least one of a graphic, music component, textual component and a video component, with simple user inputs such as a start, stop, pause, advance, cancel, replay, etc. For example, a simple advertisement may have just some text and a small graphic, with some background music that plays for 10 seconds, with user interaction supported for retrieving additional information, terminating the advertisement, and for advancing to the next advertisement.

Some of the plurality of recipient mobile devices 111, 113 can be legacy devices that do not have a necessary client component capable of handling the download and display of interactive media. Others of the plurality of other recipient mobile devices 111, 113 have the client component capable of handling the download and display of the interactive media.

In one embodiment, the distribution server 109 determines which recipient mobile device can handle interactive media (because they comprise the client component capable of handling the interactive media, and because the interactive media comprise metadata used to determine appropriateness for a device), and which need to be sent a simpler subset of the interactive media that can be displayed/rendered without the client component, such as by the use of a browser in the recipient mobile device. The browser may then be used to browse through a hosted version of the interactive media that is presented as a set of one or more web pages by the distribution server 109.

The interactive media is created/stored/distributed as a packaged content with associated metadata, employing a structured format such as an XML file. For example, for an advertisement presented as interactive media, the following components may be provided:

- an audio preamble, used to describe in audio form the purpose of the current advertisement and provide an overview of the product or service (other types of information may also be provided if necessary, in audio format)
- a textual step description regarding the product or service, in succinct form, with minimal text, and
- an audio supplementary information, providing additional details that may help a user better understand the product or service, its benefits, alternate products, if any, and any additional detail that may aid the user's comprehension of the product or service.

The distribution server 109 is capable of converting recipient list to a list of phone numbers or IP addresses as needed, in order to communicate the interactive media, or a notification regarding the availability of interactive media, to the recipient mobile devices 111, 113. In order to play all the components of an interactive media, if required, the recipient devices, such as the recipient device 111, have a client component that can handle all the components of an interactive media, audio, textual, graphics and even video components.

In one embodiment the client component, an interactive media client, is required in a recipient mobile device 111 to handle the components of an interactive media, such as audio components and textual components.

Some mobile devices, such as recipient mobile device B 113, may not have the interactive media client. In order to play all the components of an interactive media, if required, the recipient devices, such as the recipient mobile device B 113, do not have a client component. Instead, the distribution server 109 makes it possible for them to receive and display/play the interactive media by sending them the same interactive media in an alternate form, such as a simplified set of web pages, that the recipient mobile device B 113 can display using a browser or some other existing client in the recipient mobile device 113. In addition, the recipient mobile device B 113 will be sent a notification regarding the availability of an appropriate interactive media, the notification also comprises a link that can be activated to download the interactive client component so that it could be installed, before displaying the interactive media.

The recipient mobile device B 113 without the interactive media client component gets an opportunity to download & install the necessary client component. The user can then activate the download link provided (in a notification) whereupon the interactive media client component is downloaded and installed automatically (or with user opt-in). The user of the recipient mobile device B 113 also is given the option, selectively, to receive a subset of interactive media that the recipient mobile device B 113 can handle without the client component.

The recipient mobile device 111 with the interactive media client component receives an interactive media, lets user browse through the interactive media (if there are multiple steps or segments, user can browse through each step or segment, and view the textual components and listen to audio components for each, interact with the interactive client component at the appropriate places, etc. It is able to play/render/display all portions of an interactive media that may be provided, such as audio, text, graphics, video, etc. while also soliciting and acquiring user inputs at the appropriate places for the appropriate actions.

The distribution server 109 is capable of enhancing or modifying a received interacte media from a vendor or source that generates them. For example, the interactive media creator 107 may send an incomplete interactive media with two segments, each with only the audio preamble created (by a user recording the steps of an activity in audio form that incorporates a brief descriptions of steps involved) and the distribution server 109 incorporates a generic textual preamble and a generic textual description in order to complete the interactive media.

The distribution server 109 receives an interactive media from a user, incorporates text or graphics as needed, and inserts a generic or customized prompt to user, and sends the modified interactive media to recipients. The list of recipients are either specified by the user (such as an advertising company) along with the interactive media or pre-configured and stored in the server 109 to be used to forward interactive media. In addition, the user might only provide a profile of recipients, or even multiple profiles of potential recipients, and the distribution server 109 is capable of identifying actual recipients based on these profiles. For example, if a profile provided identifies potential recipients as middle aged individuals with income of over $50,000 with interests in sports and music, the distribution server 109 is capable of identifying actual recipients and targeting them for the delivery of the interactive media. In one embodiment, it identifies recipients by searching through a database of registered recipients (individuals or companies that have registered to receive the interactive media), and have provided a profile comprising their interests (sports, music, hiking, etc.) and hobbies, their preferences for interactive media categories, etc. In another embodiment, the distribution server 109 searches through one or more databases of subscriber information, the databases managed by it or managed by external systems or service providers. For example, the database may be maintained and managed by a real estate company (comprising their potential clients) and a bank (comprising their valued customers).

The distribution server 109 also supports both pull and push mode distribution of interactive media to mobile devices 111. It can send a notification of the availability of the interactive media (that a recipient may be interested in), and the recipient can trigger the retrieval of the interactive media by selecting it from a list or by some equivalent action on the mobile device 111. The triggering, or in general, the user interaction is facilitated by a interactive client component in the recipient mobile device 111, which is either made available by the manufacturer of the mobile handsets or subsequently downloaded over the air by the recipient from a server, or otherwise installed by the recipient (such as an owner of the mobile device 111). The interactive client component is able to process the received interactive media (or portions thereof), playing audio portions such as audio preambles, audio supplementary information, etc. and displaying graphics, textual preambles and textual descriptions of individual segments of a multi-segment content, facilitating interaction by user during the viewing.

In one embodiment, the system 105 comprises interactive media generator 107, mobile devices 111, 113 which are a combination of cellular phones, PDAs, etc., and the network 115 that is a wireless and/or wired network, cellular network such as 3G, UMTS, CMDA, GSM, etc., a WLAN network, or a WiMAX network, Internet, Bluetooth, IrDA, etc.

Figure 2:
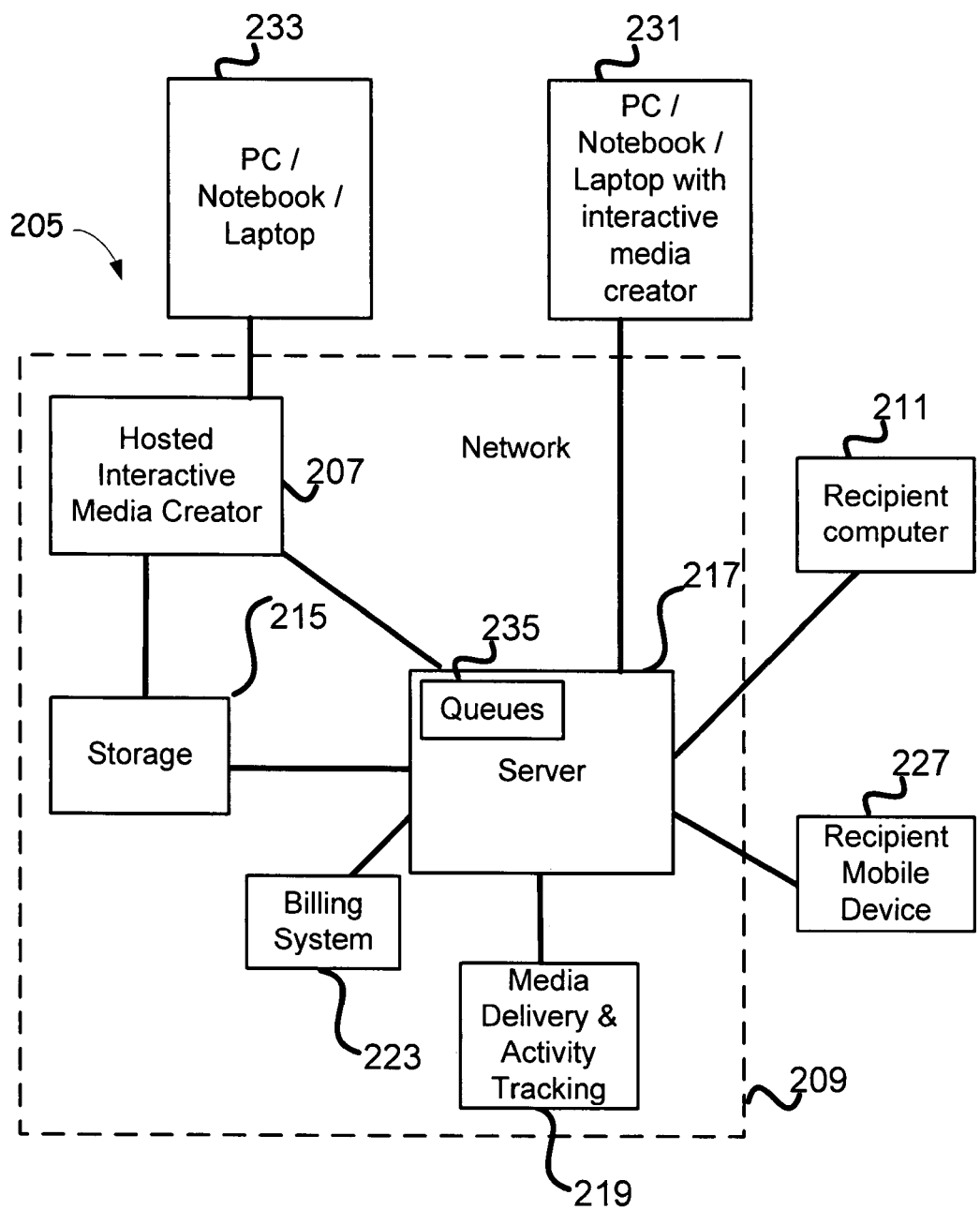
FIG. 2 is a perspective block diagram of a system that supports interactive media creation and dissemination, that is facilitated by the use of a PC/computer, by a user, or by a hosted interactive media creator that is accessed by the user using a PC/notebook/laptop.

FIG. 2 is a perspective block diagram of a system 205 that supports interactive media creation and dissemination, that is facilitated by the use of a PC/computer 231, by a user, or by a hosted interactive media creator 207 that is accessed by the user using a PC/notebook/laptop 233. The system 205 comprises the PC/computer 231 that a user uses to create interactive media, a server 217 that receives the interactive media and sends them to one or more recipient mobile devices 227 and recipient computer 211, and the hosted interactive media creator 207 that facilitates interactive media creation using the PC/laptop/computer 233, or via web pages provided by the server 217.

The system 205 also comprises a storage 215 that is used to store interactive media, user profiles, required user profiles desired by individuals or companies interested in disseminating interactive media. It also comprises a media delivery & tracking component 219 that stores results and activity logs that can be used to track interactive media creation, dissemination, and other related activities. In addition, the system 205 comprises a billing system 223 that can facilitate billing for the creation of interactive media, the distribution of interactive media, the charges or payments made to recipients of interactive media for viewing the interactive media, the charges made to individuals and companies when a recipient views delivered interactive media, etc. In general, interactive media comprises content (with or without graphics and multimedia) that requires a user to interact with a client in the viewing of it, the experience comprising user interaction. User interaction comprises user making a selection, choosing one or more items, clicking on displayed information, advancing, entering text as user inputs, providing audio inputs, or a combination of these.

The server 217 comprises a plurality of queues 235 for each user, wherein each of the plurality of queues holds a different category of interactive media for a recipient, or references to interactive media of a specific type of category that a user is likely to be interested in. In another related embodiment, the server 235 maintains several queues 235 of interactive media, some of the queues dedicated to specific categories of interactive media, to specific companies creating the interactive media, or to user groups. Other types of queues are also contemplated. When a new entry is made to any queue, target recipients are identified by the server 217 and the interactive media is either communicated to the recipients, a notification of its availability is communicated to the recipients while an entry is made in a queue for each of the recipients in the server 217 with a reference (such as an identification) to the actual interactive media stored along with it, or a copy of the interactive media is entered into a queue that is delivered to a recipient or browsed through by the recipient using the recipient mobile device 227.

Interactive media creation is also facilitated by the hosted interactive media creation component 207 that can be accessed and used by a user employing the PC/Notebook/Laptop 233. An interactive media creation tool installed in the PC/Notebook/Laptop 231 may also be used by a user to create interactive media that can be uploaded to the server 217. A user with interactive media creation tool in the PC/Notebook/Laptop 231 creates an interactive media and sends the created interactive media to recipients/a mailing-list that the server 217 can communicate with.

The user can also employ a PC/Notebook/Laptop 231 communicatively coupled to a hosted interactive media creation component 217 to create interactive media with only audio inputs and textual inputs provided by the user for the various steps of an associated activity. The interactive media is likely to comprise of audio and/or textual preambles for the steps of an audio guided activity, textual descriptions of the steps of the associated activity, supplementary information in audio and textual formats (even graphics and video formats) for each of the segments (if there are multiple segments), etc. Then the user provides a recipient list in one or more formats. The server 217 sends out the interactive media to recipients specified by the user, using their corresponding mobile phone numbers, IP addresses, email addresses, etc. A recipient user can use his recipient computer 211 to receive or browse thorough the interactive media. A different recipient user can use the recipient mobile device 227 to do the same.

When a recipient using the recipient mobile device 227 gets the interactive media on his mobile device, the segments of the interactive media themselves are provided to the recipient by the server 217, starting with the first segment of a multi-segment activity. Thus, in the beginning of the interactive media, the recipient would view the first segment, perhaps with an audio preamble and appropriate textual description, and would be able activate an Info menu item to hear the audio preamble for the first segment. The user advances to the next segment by activating the Next menu item to proceed, etc. Alternatively, all segments are provided at once to the recipient mobile device 227 wherein the interactive media client component manages its local display/rendering.

In one embodiment, an XML based interactive media is created/stored/by a user using a PC/notebook/laptop 231. It is created as an XML file comprising multiple segments—wherein each segment comprises:

an audio preamble,
graphics
a textual step description, and
an audio supplementary information.

The audio preamble and audio supplementary information are played/rendered during a display of a segment, when invoked by the user using appropriate menu-items or buttons. The textual segment description comprises Textual description in the form of a small paragraph. Optionally, it also comprises a graphics or a picture that is also provided as part of the XML based interactive media.

Figure 3A:
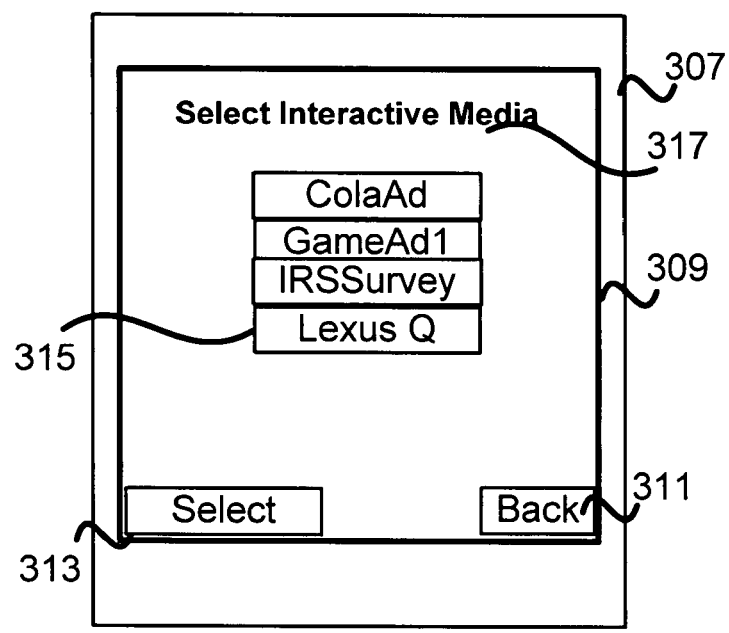
FIG. 3A is an exemplary display screen for a mobile device that supports the display of interactive media using an interactive media client component, or the browsing through an interactive media from the mobile device using a browser.

FIG. 3A is an exemplary display screen 309 for a mobile device 307 that supports the display of interactive media using an interactive media client component, or the browsing through an interactive media from the mobile device 307 using a browser. The mobile device 307 receives notifications, such as those received as an SMS message, sent to the user (for example, message of type Service message). The notifications offers the user an opportunity to download a client component that is capable of displaying an interactive media. The exemplary display screen 309 provides a list of interactive media 315 to the user, and the user can select one of them for display using a select button 313 or menu item provided. The user can exit the interactive media client by activating the back button 311 or menu item.

In one embodiment, the list of interactive media 315 are those provided to the user by a distribution server. Such a list is provided based on user preferences and user profile by a server. A user can subscribe to one or more categories of interactive media, or one or more sources of interactive media (sources being content development companies, etc.) and the distribution server stores that information as part of the user's preferences and selects interactive media for delivery to the mobile device 307 based on that. In a related embodiment, such a list is provided based on a priority of interactive media determined by the distribution server. In a different embodiment, the user's selections of various subscriptions of interactive media is managed by the distribution server which provides an RSS feed of the selected interactive media to the user on his mobile device 307.

In one embodiment, the mobile screen 309 is a screen saver screen that is displayed to the user when the user is not using the phone (meaning the phone has been idle for a while). The screen saver 309 on the mobile gets a list of interactive media, such as a list of interactive mobile advertisements and surveys, and displays it to the user. The user can select one of them, and advance to others subsequently, and exit the screen saver whenever the user wants to. In one embodiment, the screen saver 309 is provided references to interactive media as a list to be displayed, wherein the list is complied by a server based on user's preferences, subscriptions to interactive media, user profile (comprising user's interests, hobbies, employment, residential location, etc.) or a combination thereof.

Figure 3B:
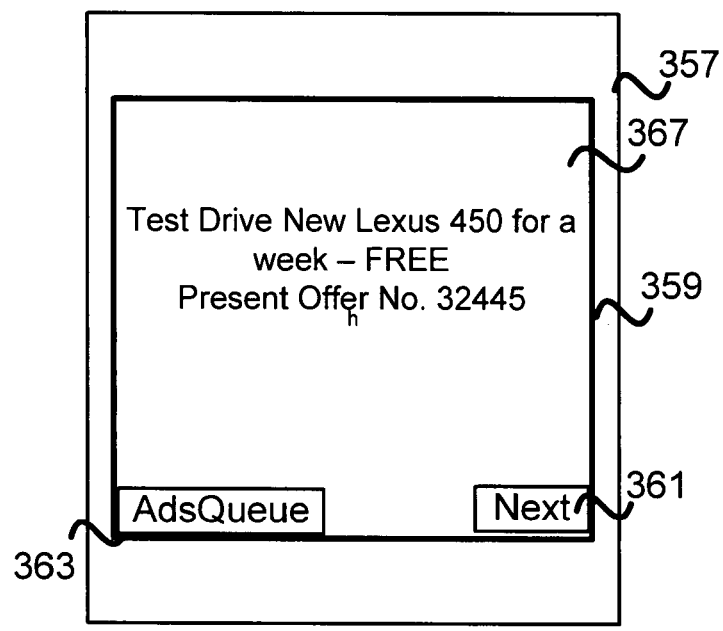
FIG. 3B is an exemplary screen of an interactive media client component on a mobile device wherein an interactive advertisement is displayed, that has been selected from an queue of advertisements.

FIG. 3B is an exemplary screen of an interactive media client component 359 on a mobile device 357 wherein an interactive advertisement 367 is displayed, that has been selected from an queue of advertisements 363. Using a Next button 361 on the screen 359, a user can advance to the next interactive media on the current queue AdsQueue 363. The screen of the client component 359 can display interactive media from different queues when a user changes the current queue or select a queue by selecting one from a list of queues (shown in FIG. 3A). Each user has at least one queue of waiting interactive media at a server (not shown), that is accessible by the interactive media client component 359. A user can set the priority of interactive content from each queue, or a priority for content from more than one queue, or prioritize queues. A user can create a profile of user's interests, hobbies, employment, etc. that is incorporated for prioritizing interactive media selected and presented to the user.

Figure 3C:
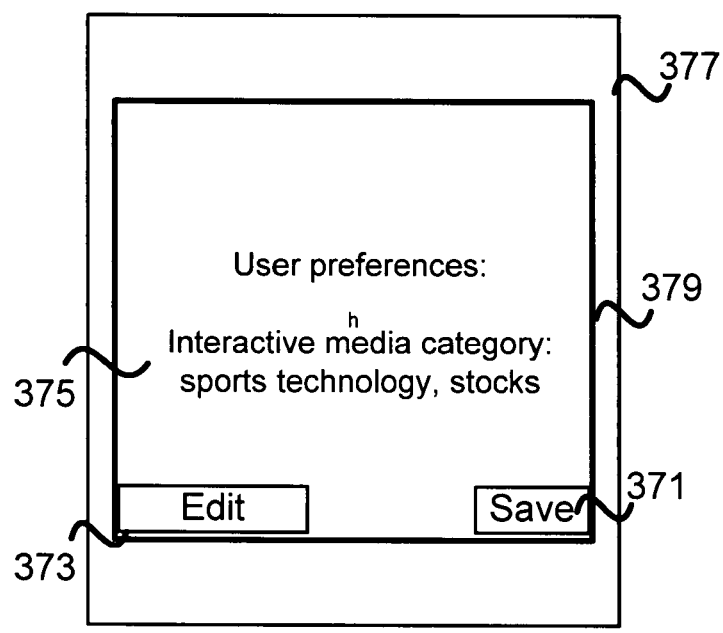
FIG. 3C is an exemplary screen/window on a mobile device that is used to by a user to set user preferences, specifically a selection of categories of interactive media to be delivered to the user, a priority being assigned to them too.

FIG. 3C is an exemplary screen/window 379 on a mobile device 377 that is used to by a user to set user preferences, specifically a selection of categories of interactive media to be delivered to the user, a priority being assigned to them too. The user preferences selected/provided by a user is communicated to a server that stores it and employs it to send interactive media to the user. The server selects/provides interactive media to the user satisfying user specified needs and preferences from the available interactive media, which is supplied by vendors of products, advertisers of products, services or suppliers of information or products, etc. The screen 379 makes it possible for a user to edit 373 the user preferences and save 371 updated preferences.

Figure 4:
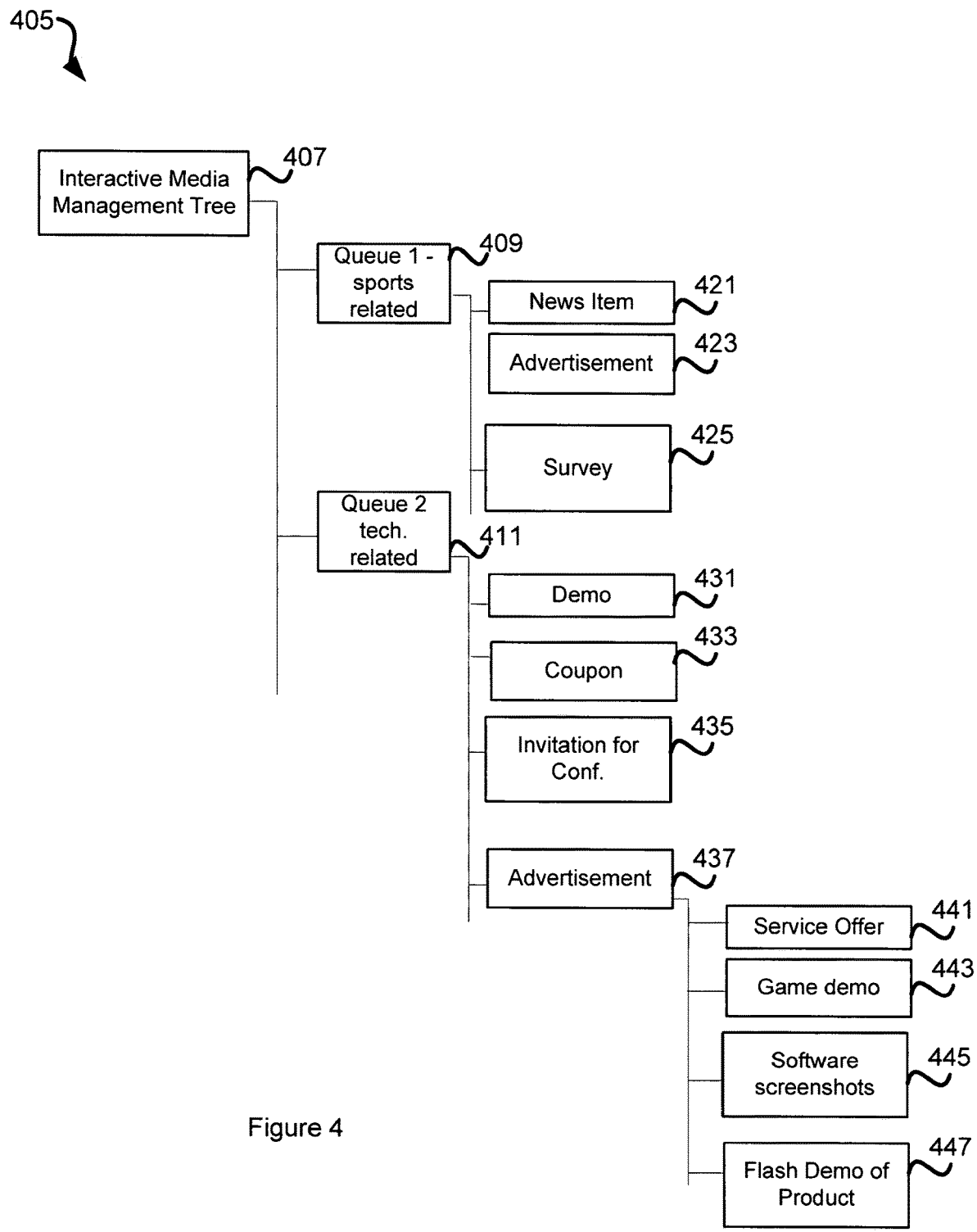
FIG. 4 is a perspective block diagram of the interactive media management tree of information, a logical organization of interactive media, by a server in the system that facilitates creation and distribution of interactive media.

FIG. 4 is a perspective block diagram of the interactive media management tree 407 of information, a logical organization of interactive media, by a server in the system that facilitates creation and distribution of interactive media. The interactive media management tree 407 comprises several categories of interactive media, each category assigned a queue, such as a queue 1 for sports related interactive media 409, which in turn comprises news items 421, advertisements 423 and surveys 425. Similarly, technology related interactive media is assigned a queue 2 411 that can be used to store and distribute interactive media such as interactive demos 431, interactive coupons 433, interactive invitations for conferences 435, interactive advertisements 437, etc. Interactive advertisements 437 can be interactive service offers 441, interactive game demos 43, interactive software screenshots 445 (such as for applications), flash demos of products 447, etc.

Figure 5:
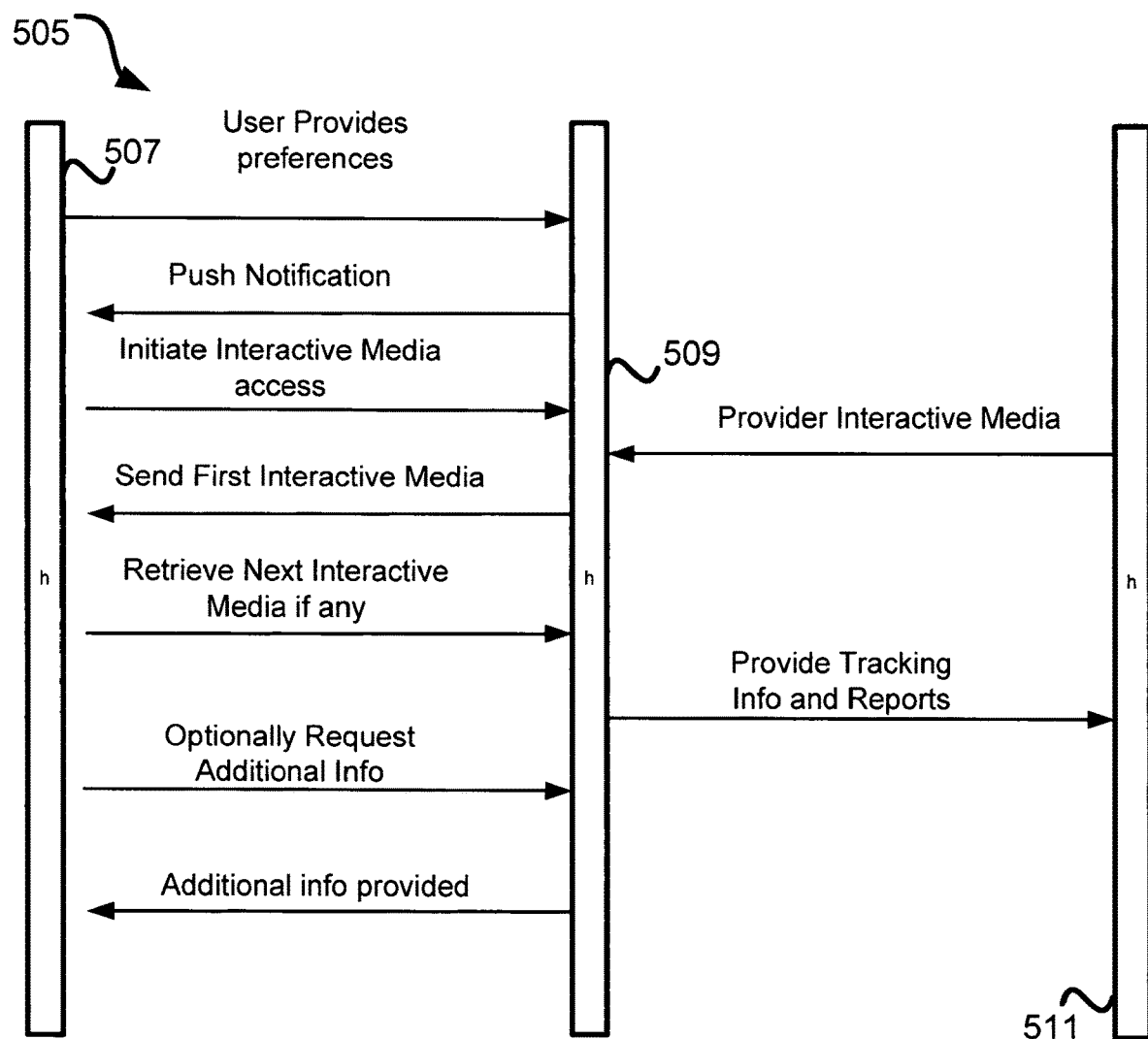
FIG. 5 is an interaction diagram that depicts an exemplary interaction between a recipient device used to respond to the interactive media such as advertisements and questionnaires, wherein the recipient device (a PC, notebook, PDA or laptop) is used by a user to access/retrieve interactive media from one or more distribution servers.

FIG. 5 is an interaction diagram that depicts an exemplary interaction between a recipient device 507 used to respond to the interactive media such as advertisements and questionnaires, wherein the recipient device (a PC, notebook, PDA or laptop 507) is used by a user to access/retrieve interactive media from one or more distribution servers 509. The recipient device 507 provides user preferences, such as categories of interactive media of interest to the user, to the distribution server 509, based upon which the distribution server 509 sends push notification to the recipient device 507. After receiving the push notification, a user can initiate access of (one or more) interactive media. The distribution server sends one or more interactive media to the recipient device for review by the user. Additional info related to/associated with the interactive media, such as details of for products and services associated with interactive advertisements, may be requested by a user and the distribution server 509 sends them to the recipient device 507 for review by a user. The interactive media is typically created using an interactive content creation tool 511 that is communicatively coupled to the distribution server 509. The interactive content creation tool 511, or another external server, such as a billing server, can be the recipient of tracking information and reports sent by the distribution server 509.

Figure 6:
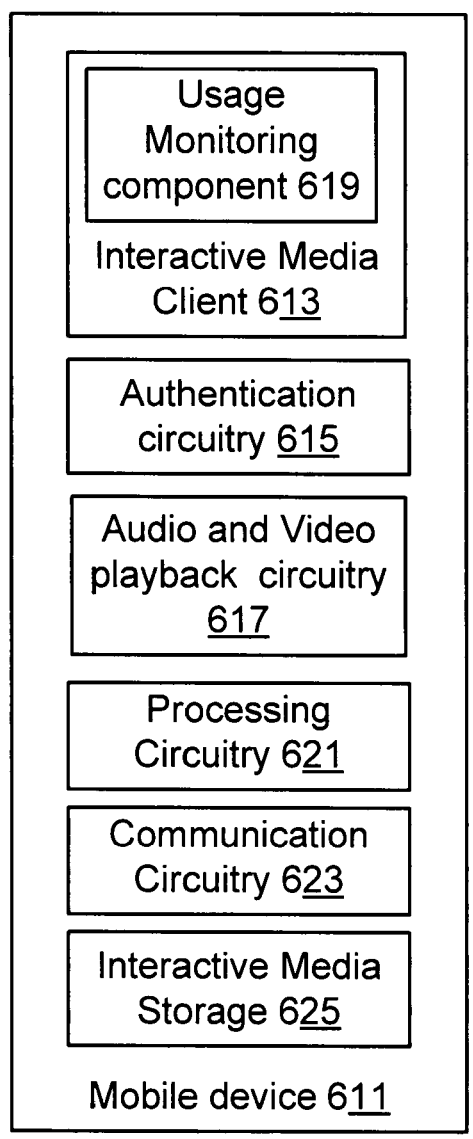
FIG. 6 is a perspective block diagram of a mobile device capable of receiving and playing/rendering interactive media and monitoring its usage.

FIG. 6 is a perspective block diagram of a mobile device 611 capable of receiving and playing/rendering interactive media and monitoring its usage. The mobile device 611 comprises an interactive media client 613 that in turn comprises an usage monitoring component 619. The mobile device 619 also comprises an authentication circuitry 615, an audio and video playback circuitry 617, processing circuitry 621, communication circuitry 623 and an interactive media storage 625.

Figure 7:
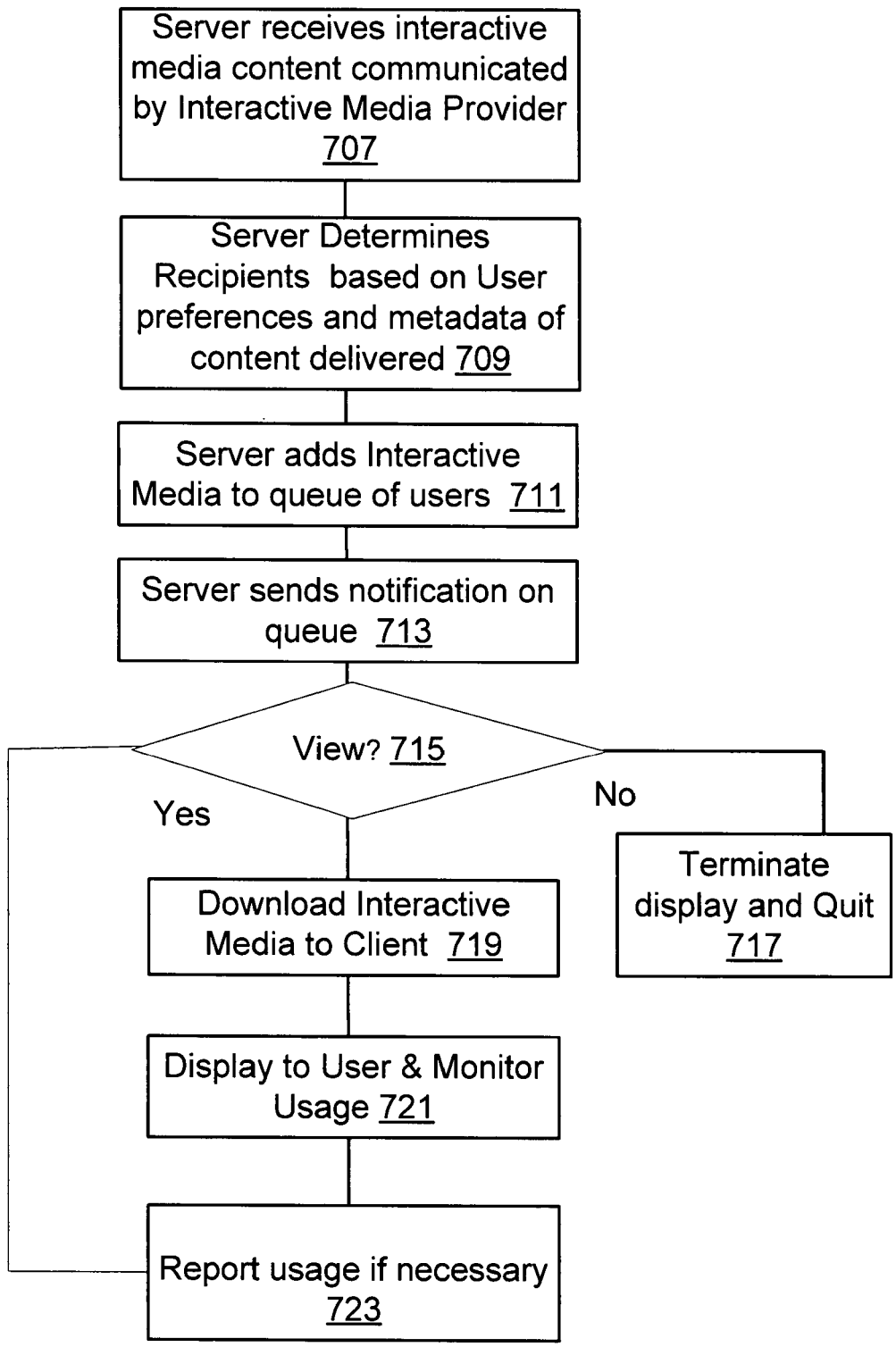
FIG. 7 is a flow chart of the operation of a distribution server as it receives interactive media from a provider and communicates it eventually to users of mobile devices.

FIG. 7 is a flow chart of the operation of a distribution server as it receives interactive media from a provider and communicates it eventually to users of mobile devices. At a start block 707, the operation starts when the server receives interactive media from a provider of interactive media. At a next block 709, the server determines who the recipients should be for the interactive media, based on user preferences available and metadata of the interactive media delivered by the provider. For example, the metadata comprises a category identification, a target profile describing a likely profile of recipients expected to be interested in the interactive media, security information such as credentials of the provider and authentication information, a digital signature of the interactive media for integrity check, etc.

Then, at a next block 711, the server adds the received and authenticated (and integrity checked) interactive media (or reference thereto) to queue of users 711 who are determined to be targets for delivery. Then, at a next bloc 713, the server sends a notification to the user's mobile device to notify the user of the availability of the interactive media in the queue. In one embodiment, the server creates a list of references to the interactive media that is available, and sends it to the mobile device to be shown in a queue/list (or more than one queue/list) from which the user can select.

Then, at a next decision block 715, the user selectively decides to view the interactive media, and either selects it for viewing or terminates viewing. In one embodiment, the user of the recipient mobile device browses through the list of available interactive media and selects one of them for viewing. If the user decides to view one of the items listed, the control passes to a next block 719, otherwise, processing terminates at a next block 717.

If, at the decision block 715, the user on the mobile device decides to view an interactive media (either from a list presented, from a notification received for interactive media or otherwise), at a next block 719, the interactive media client component downloads the interactive media. Then at a next block 721, the interactive media is displayed to enable viewing by the user. The interactive media client component monitors usage by the user. Finally, at the next block 723, the viewing of the interactive media by the user is reported to the server by the client, and optionally to a billing server or external server (such as one associated with the provider) by the server. Then, control loops back to the decision block 715 where the user is provided an opportunity to view additional interactive media that may be available.

Figure 8:
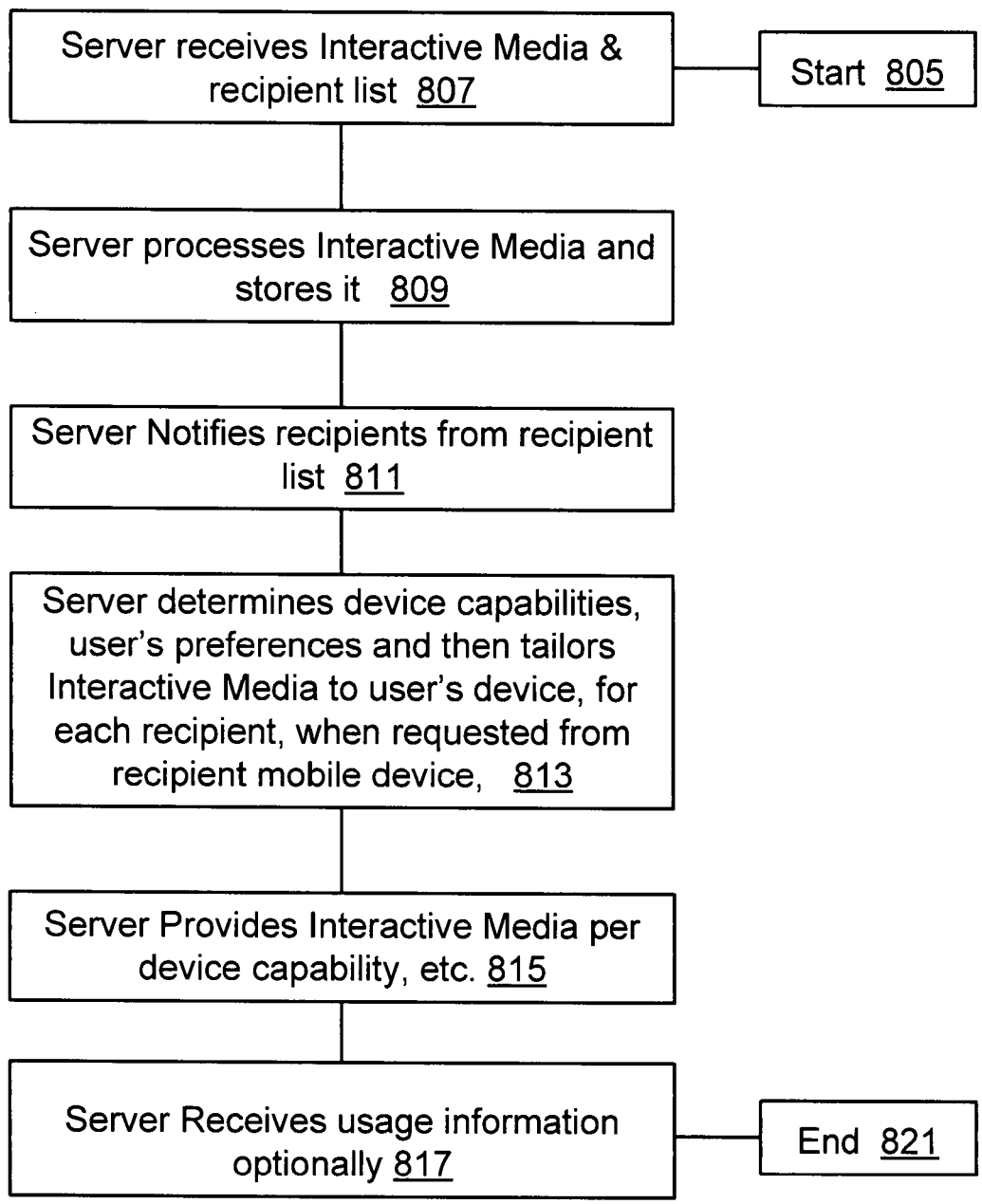
FIG. 8 is a flow chart of an exemplary operation of the server capable of distributing interactive media.

FIG. 8 is a flow chart of an exemplary operation of the server capable of distributing interactive media. Processing starts at a start block 805. Then, at a next block 807, the server receives interactive media and a recipient list from a provider of interactive media. Then, at a next block 809, the server processes the received interactive media and recipient list and stores it. Then at a next block 811, the server notifies recipients from the list about the availability of the interactive media. It can also communicate a reference to the interactive media to the mobile device as part of the notification. Then, at a next block 813, the server determines the device capabilities of the recipient devices, user's preferences, etc. Then the server tailors interactive media to user's mobile device, for each recipient, when requested from recipient mobile device. Then, at a next block 815, the server provides interactive media to each of the recipient devices based on device capabilities. Then, at a next block 817, the server optionally receives usage information from the mobile devices and sends them (after optional collation) to a provider's server (or a billing server). Finally, processing terminates at the next end block 821.

The terms "circuit" and "circuitry" as used herein may refer to an independent circuit or to a portion of a multi-functional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The terms "audio preamble" and "voice preamble" as used herein may refer to recorded voice inputs that a user records, to provide a question/prompt in human language, that also selectively incorporates responses in multiple choice format to aid selection by a recipient. The audio preamble may be captured by a mobile device in MP3 format, AMR format, WMA format, etc.

The term "audio-assisted questionnaire" as used herein may refer to a questionnaire comprising audio portions, such as audio preambles, audio supplementary information, audio descriptions of multiple choices, etc. that make it possible for a recipient to listen to most of the information of the questions in a questionnaire (employing human voices, in audible form) without having to read all of that in a small screen of a mobile device, without requiring scrolling through textual descriptions on a limited/constrained device.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:
1. A method comprising:
identifying, based on a request from a client device, an interactive-software-application demonstration comprising multiple segments without certain graphics for selectable options;
generating graphics representing selectable options in a customized size and a customized format for incorporation within the multiple segments of the interactive-software-application demonstration based on detected capabilities of the client device;
providing, to the client device via a communication network for display within an interactive-client component, the interactive-software-application demonstration comprising the multiple segments including the graphics representing the selectable options in the customized size and the customized format;

receiving a usage report from the client device indicating a user's interaction with one or more of the graphics representing the selectable options in the customized size and the customized format within the multiple segments of the interactive-software-application demonstration, wherein a usage-monitoring component on the client device generates the usage report indicating the user's interaction with the one or more of the graphics;

based on receiving the usage report, identifying a survey question concerning the interactive-software-application demonstration; and providing, to the client device via the communication network, the survey question concerning the interactive-software-application demonstration.

2. The method of claim 1, wherein the interactive-software-application demonstration comprises an interactive demonstration of a game.

3. The method of claim 1, wherein the interactive-software-application demonstration comprises an interactive demonstration of a product advertisement.

4. The method of claim 1, wherein the interactive-software-application demonstration comprises an interactive demonstration of screenshots from a software application.

5. The method of claim 1, further comprising receiving, from the client device via the communication network, an indication of a response to the survey question concerning the interactive-software-application demonstration.

6. The method of claim 5, wherein generating the graphics representing the selectable options in the customized size and the customized format for incorporation within the multiple segments of the interactive-software-application demonstration comprises generating a compacted version of the graphics for a first type of computing device corresponding to the client device in a more compacted format than a version of the graphics for a second type of computing device.

7. The method of claim 1, wherein the survey question comprises a first selectable response option and a second selectable response option.

8. The method of claim 7, further comprising receiving, from the client device via the communication network, an indication of a selection of the first selectable response option.

9. The method of claim 8, further comprising:
determining that the first selectable response option relates to an additional survey question concerning the interactive-software-application demonstration; and
providing, to the client device via the communication network, the additional survey question.

10. A system, comprising:
at least one processor; and
at least one non-transitory computer readable storage medium storing instructions thereon that, when executed by the at least one processor, cause the system to:
identify, based on a request from a client device, an interactive-software-application demonstration comprising multiple segments without certain graphics for selectable options;
generating graphics representing selectable options in a customized size and a customized format for incorporation within the multiple segments of the interactive-software-application demonstration based on detected capabilities of the client device;
provide, to the client device via a communication network for display within an interactive-client component, the interactive-software-application demonstration comprising the multiple segments including the graphics representing the selectable options in the customized size and the customized format;
receive a usage report from the client device indicating a user's interaction with one or more of the graphics representing the selectable options in the customized size and the customized format within the multiple segments of the interactive-software-application demonstration, wherein a usage-monitoring component on the client device generates the usage report indicating the user's interaction with the one or more of the graphics;
based on receiving the usage report, identify a survey question concerning the interactive-software-application demonstration; and
provide, to the client device via the communication network, the survey question concerning the interactive-software-application demonstration.

11. The system of claim 10, wherein the interactive-software-application demonstration comprises an interactive demonstration of a game.

12. The system of claim 10, wherein the interactive-software-application demonstration comprises an interactive demonstration of screenshots from a software application.

13. The system of claim 10, further comprising instructions that, when executed by the at least one processor, cause the system to receive, from the client device via the communication network, an indication of a response to the survey question concerning the interactive-software-application demonstration.

14. The system of claim 13, further comprising instructions that, when executed by the at least one processor, cause the system to determine not to provide a particular survey question concerning the interactive-software-application demonstration based on the response to the survey question.

15. The system of claim 10, further comprising instructions that, when executed by the at least one processor, cause the system to:
determine that the client device comprises the interactive-client component; and
based on the determination that the client device comprises the interactive-client component, provide the interactive-software-application demonstration in a format compatible with the interactive-client component.

16. The system of claim 10, further comprising instructions that, when executed by the at least one processor, cause the system to:
determine that the client device does not comprise the interactive-client component; and
based on the determination that the client device does not comprise the interactive-client component, provide the interactive-software-application demonstration in a format compatible with a web browser.

17. A non-transitory computer readable storage media storing instructions thereon that, when executed by a processor, cause a computer system to:
identify, based on a request from a client device, an interactive-software-application demonstration comprising multiple segments without certain graphics for selectable options;
generate graphics representing selectable options in a customized size and a customized format for incorporation within the multiple segments of the interactivesoftware-application demonstration based on detected capabilities of the client device;

provide, to the client device via a communication network for display within an interactive-client component, the interactive-software-application demonstration comprising the multiple segments including the graphics representing the selectable options in the customized size and the customized format;

receive a usage report from the client device indicating a user's interaction with one or more of the graphics representing the selectable options in the customized size and the customized format within the multiple segments of the interactive-software-application demonstration, wherein a usage-monitoring component on the client device generates the usage report concerning the user's interaction with the one or more of the graphics;

based on receiving the usage report, identify a survey question concerning the interactive-software-application demonstration; and provide, to the client device via the communication network, the survey question concerning the interactive-software-application demonstration.

18. The non-transitory computer readable storage media of claim 17, wherein the survey question comprises multiple selectable response options.

19. The non-transitory computer readable storage media of claim 18, further comprising instructions that, when executed by the processor, cause the computer system to receive an indication of a selection of a selectable response option from among the multiple selectable response options.

20. The non-transitory computer readable storage media of claim 18, further comprising instructions that, when executed by the processor, cause the computer system to:

determine the selectable response option relates to an additional survey question concerning the interactive-software-application demonstration; and provide, to the client device via the communication network, the additional survey question.

* * * * *